April 14, 1959 W. BORNEMANN 2,881,658

PHOTOGRAPHIC RECORDING APPARATUS

Filed May 13, 1955 10 Sheets-Sheet 1

WILLIAM BORNEMANN
INVENTOR.

BY Daniel J. Mayne
Lloyd F. Seebach
ATTORNEY & AGENT

April 14, 1959 W. BORNEMANN 2,881,658

PHOTOGRAPHIC RECORDING APPARATUS

Filed May 13, 1955

10 Sheets-Sheet 2

WILLIAM BORNEMANN
INVENTOR.

BY [signature]

[signature]

ATTORNEY & AGENT

April 14, 1959 W. BORNEMANN 2,881,658

PHOTOGRAPHIC RECORDING APPARATUS

Filed May 13, 1955 10 Sheets-Sheet 3

WILLIAM BORNEMANN
INVENTOR.

BY Daniel I. Mayne
Lloyd F. Seebach
ATTORNEY & AGENT

April 14, 1959 W. BORNEMANN 2,881,658

PHOTOGRAPHIC RECORDING APPARATUS

Filed May 13, 1955 10 Sheets-Sheet 4

WILLIAM BORNEMANN
INVENTOR.

BY Daniel D. Mayne
Lloyd F. Seebach
ATTORNEY & AGENT

PHOTOGRAPHIC RECORDING APPARATUS

Filed May 13, 1955 10 Sheets-Sheet 5

WILLIAM BORNEMANN
INVENTOR.

BY Daniel J. Mayne
Lloyd F. Seebach
ATTORNEY & AGENT

April 14, 1959 W. BORNEMANN 2,881,658

PHOTOGRAPHIC RECORDING APPARATUS

Filed May 13, 1955 10 Sheets-Sheet 6

WILLIAM BORNEMANN
INVENTOR.

BY Daniel I. Mayne
Lloyd F. Sutach
ATTORNEY & AGENT

WILLIAM BORNEMANN
INVENTOR.
BY Daniel J. Mayne
Lloyd F. Seebach
ATTORNEY & AGENT April 14, 1959 W. BORNEMANN 2,881,658

PHOTOGRAPHIC RECORDING APPARATUS

Filed May 13, 1955 10 Sheets-Sheet 8

WILLIAM BORNEMANN
INVENTOR.

BY Daniel I. Mayne
Lloyd F. Seebach
ATTORNEY & AGENT

WILLIAM BORNEMANN
INVENTOR.
BY Daniel J. Mayne
Lloyd F. Seebach
ATTORNEY & AGENT

PHOTOGRAPHIC RECORDING APPARATUS

Filed May 13, 1955 10 Sheets-Sheet 10

WILLIAM BORNEMANN
INVENTOR.

BY Daniel I. Mayne

Lloyd F. Seebach

ATTORNEY & AGENT

United States Patent Office 2,881,658

Patented Apr. 14, 1959

2,881,658

PHOTOGRAPHIC RECORDING APPARATUS

William Bornemann, Rochester, N.Y., assignor to Eastman Kodak Company, Rochester, N.Y., a corporation of New Jersey Application May 13, 1955, Serial No. 508,139

21 Claims. (Cl. 88—24)

The invention relates to photographic recording apparatus and more particularly to a photographic recording camera in which related information positioned in different photographing stations is recorded in successive and adjacent areas longituidnally of a light-sensitive material.

Although recording cameras of various kinds are utilized for purposes of microfilming and in conjunction with recording of related information, such as recording cameras for punched statistical cards, the light-sensitive material is normally maintained in its strip form after exposure and processing for purposes of storage and use. The present recording camera, however, is utilized for producing a series of record bearing elements on a film strip which is maintained in strip form for purposes of processing and then severed into individual elements which are then used similarly to punched cards. Such record bearing elements comprise a transverse aperture at one end for handling purposes, an area in which a plurality of document images are arranged both longitudinally and transversely of the element, and intermediate the aperture and document images successive lines of code are positioned, the code being related to document information, subject matter, classification, etc. The code and document images are, therefore, arranged in sucsucessive adjacent areas of the film strip.

The primary object of the invention, therefore, is to provide a photographic camera in which related information positioned in different photographing stations is recorded in successive adjacent areas of a light-sensitive medium or film strip.

Another object of the invention is to provide a photographic camera in which the light-sensitive material is advanced intermittently in predetermined and equal increments for recording the information positioned in one photographing station in successive portions of one area and in a predetermined multiple of the increment for recording the information positioned in the other photographing station in successive portions of the other and adjacent area of the light-sensitive material.

Still another object of the invention is to provide a photographic camera in which the optical means associated with each of the photographing stations is positioned with respect to the exposure station by means of a common carrier which is movable transversely of the light-sensitive material and the exposure station, the optical means being offset with respect to each other whereby one images the information in one photographing station in a single area transversely of the light-sensitive material and the other images the information in the other photographing station in successive areas transversely and longitudinally of the light-sensitive material.

A further object of the invention is to provide a photographic camera in which a carriage means for moving the light-sensitive material is movable between two positions for advancing a predetermined length of the light-sensitive material past the exposure station and includes means for perforating a transverse aperture in the light-sensitive material and a vacuum producing means, the perforating means remaining in engagement with the light-sensitive material and the vacuum being maintained during movement of the carriage means in one direction for moving the light-sensitive material.

And still another object of the invention is to provide a photographic camera in which various functions thereof are completely automatic and in which the information to be positioned in one photographing station controls the operation thereof, whereas the operation for recording the information to be positioned in the other photographing station is controlled by the operator.

Other objects and advantages of the invention will be readily apparent from the following disclosure and description of a camera embodying the invention.

The invention comprises an exposure station which is arranged in a plane perpendicular to that of one photographing station in which information in the form of code bits is positioned and parallel to that of another photographing station in which information, such as various types or forms of documents, is positioned. The code bits positioned in the one photographing station are set up from a punched tape, such as that produced by the tape controlled typewriter disclosed in U. S. Patent No. 2,700,445. With reference to my copending application Serial No. 508,138 filed May 13, 1955, a more detailed description of the target positioned in and forming the one photographing station, as well as the manner in which it functions and is controlled, can be obtained. Such a target presents a plurality of illuminated apertures successively in the one photographing station and which, by suitable optical means, are imaged on the light-sensitive material. The tape which carries the code controls the target, i.e., the setting up of the illuminated apertures, as well as the operation of the camera for accomplishing the successive exposures of the code positioned in the target.

For photographing the documents positioned in the other photographing station, the initiation of each exposure is controlled by the operator although film advance, position of the optical means, and other functions are performed automatically and sequentially by the camera. The film strip is moved from a supply reel past the exposure station and to a take-up reel by a movable carriage which carries a punch for perforating a transverse aperture in each length of film advanced and is provided with a chamber, the under side of which is enclosed by a perforated member and to which a vacuum producing means is attached. The perforating punch remains in engagement with the film strip and the vacuum is maintained during movement of the carriage means in one direction for maintaining the film strip in engagement with the carriage means and for advancing the film strip therewith. Adjacent the farthest position of the carriage means, a clamping device is positioned for engaging the film strip to prevent retrograde movement thereof during the return movement of the carriage means. A carrier for the optical means associated with each photographing station is movable transversely of the film strip, the optical means associated with the one photographing station being normally positioned centrally of the film strip and the exposure station and the other optical means being moved transversely of the film strip with said carrier means to image the documents transversely and longitudinally of the film strip.

A drive means is coupled to each of three shafts, the first carrying a cam for moving the carriage means, as well as two ratchets which when rotated also rotate the cam in predetermined increments or in a multiple of said increment for exposure of the code and documents, respectively. The second shaft drives a cam which moves the carrier means and also an eccentric connected to a pawl for rotating the coarse ratchet. The third shaft carries an eccentric connected to a pawl for rotating the fine ratchet. Coupling of the fine ratchet drive to the drive means for advancing the film strip in increments to record the code is controlled by the punched tape and coupling of the coarse ratchet drive to the drive means is controlled by the operator as well as coupling the drive means directly to the cams for moving the carriage means and carrier means to their initial or zero position. A group of cams associated with each shaft controls the sequential operation of the camera as well as of the perforating means, vacuum producing means and clamping device.

Although reference is made to "light-sensitive material," "code," "document" and other terms throughout the disclosure it is to be understood that these terms are not to be interpreted in their most limited sense. For instance, the term "light-sensitive material" is meant to be any photographic film or paper, whether negative or positive, in either strip or cut form.

Reference is now made to the accompanying drawings wherein like reference numerals and letters designate like parts and wherein.

Figure 1:
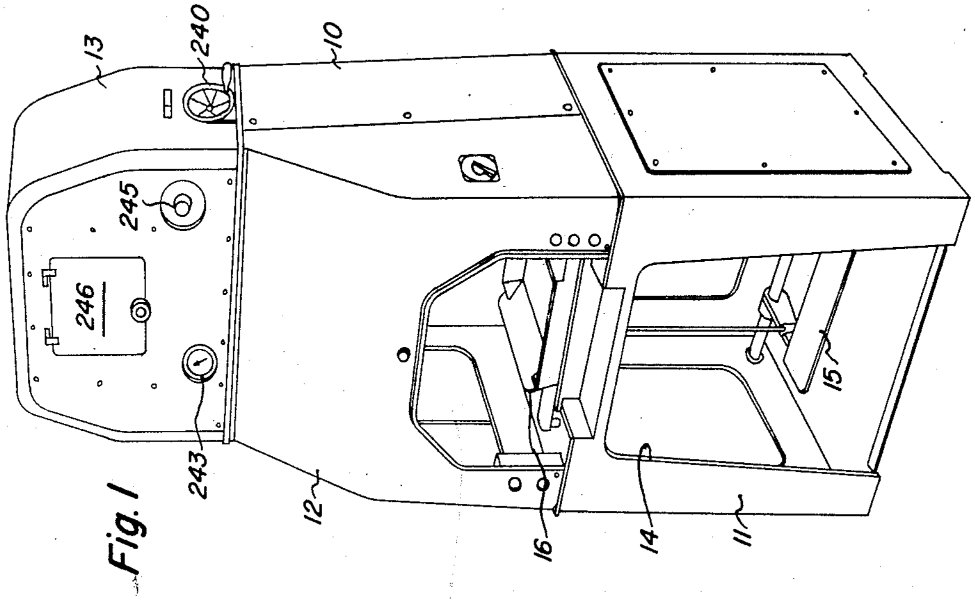
Fig. 1 is a perspective view of the external appearance of the recording apparatus embodying the invention.
Figure 2:
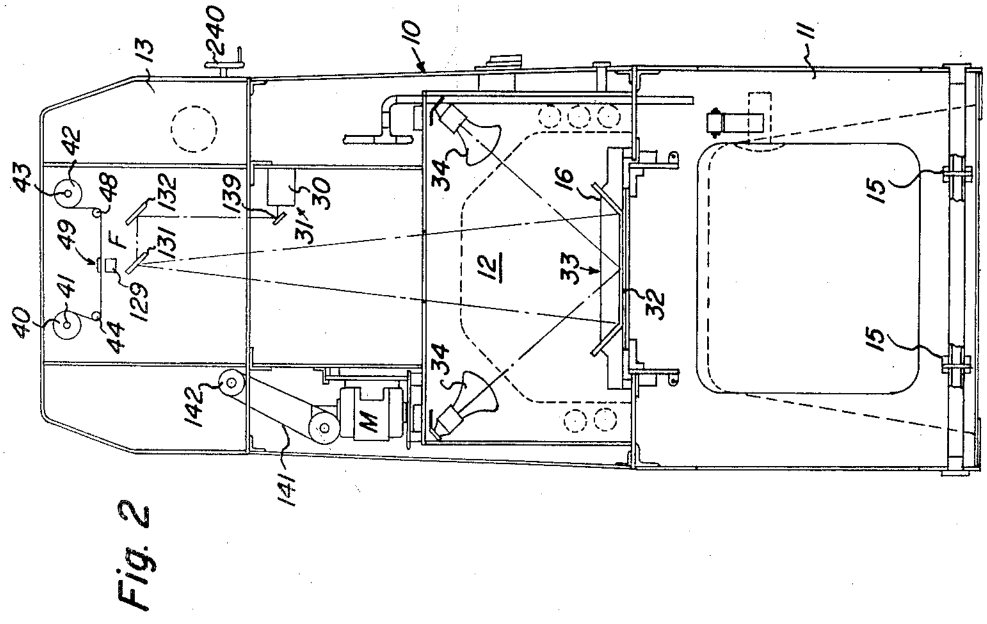
Fig. 2 is a diagrammatic front elevation of the recording apparatus showing the relation of the photographing stations to the exposure station and light-sensitive material.

In the recording apparatus disclosed in Figs. 1 and 2, cabinet 10 encloses three divisions of the apparatus; namely, base 11, photographing section 12 and film unit 13. Base 11 is provided at the front thereof with kneehole 14 to permit the operator to be seated with respect to the photographing section. Treadle 15 is mounted within base 11 and by suitable connections operates the copy platen 16 in the photographing section. Within the section 12, two photographing stations are provided which present related information for recording in different areas of each element exposed in strip form in film unit 13.

Figures 3, 4, 5:
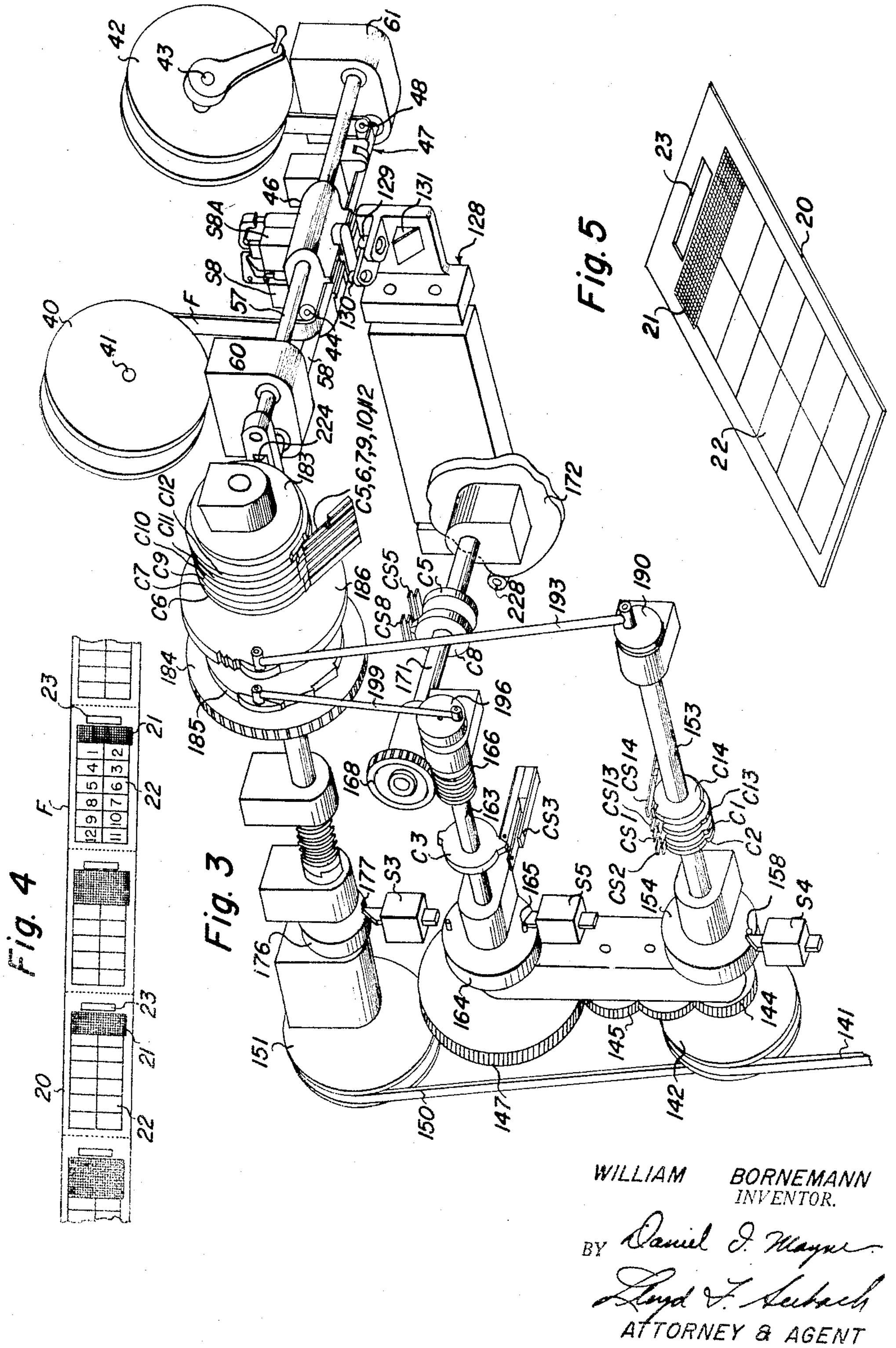
Fig. 3 is a diagrammatic perspective view of the essential elements of the recording apparatus for advancing the light-sensitive material and for controlling the sequential operation thereof.
Fig. 4 is a plan view of a processed film strip showing the exposures made thereon.
Fig. 5 is an enlarged detail view of the form of an individual record element obtained from a processed film strip after severing.

The individual record element 20, as shown in Fig. 5, is obtained from the film strip F, as shown in Fig. 4 after processing and severing of strip F. Each of elements 20 comprises a code area 21 and a document image area 22 and is provided with a transverse aperture 23. In order to facilitate handling of such elements during processing, the individual elements are recorded on strip film and processed and, after processing, are then severed into individual elements. With space between the aperture and the first exposure and between the last exposure and the edge of the card, sufficient space is left therebetween to expose seventy lines of code lengthwise of the film or fourteen document images arranged in two columns side by side across the film with each column having seven document images. In other words, each group of ten lines of code longitudinally of the film strip is equivalent to two document images, and each line of code comprises forty-two possible positions. As a result, an element can be exposed completely with lines of code, can be exposed completely with document images or can be exposed with a combination of lines of code and document images.

Inasmuch as factors, such as the reduction factor, film advance, etc., differ for the lines of code and the documents, it can be readily appreciated that separate optical systems, film advancing mechanisms and photographing stations are necessary for exposing or recording the related information on the same film strip. Since the code pertains to the documents and is utilized for purposes of identity, classification, etc., the code images and the document images to be recorded are related.

In one aspect of such a system, the document is first considered for classification, category, subject matter, or any other heading and the proper code assigned thereto. The code is then punched into a paper tape by means of a tape typewriter, such as is disclosed in the above U.S. Patent No. 2,700,445. Such a tape can contain practically an indefinite number of lines of code designations and utilizes a six position code structure, each line of code punched being representative of a character as is well known. In my above-mentioned copending application, a device for presenting a predetermined number of lines of code is disclosed and is applicable to such a recording apparatus. This device presents a pattern of light corresponding to code positions sensed in a predetermined number of successive lines of code, the pattern in the described embodiment having forty-two possible code positions and since each line of code comprises a possible six positions, seven lines of code can be presented for each exposure. If it is assumed that seventy characters are necessary to properly code a twelve page document, then the document and its code will require just one complete element, the seventy characters occupying ten lines of code which is equivalent to two document image areas transversely of the film and the twelve pages of the document being imaged in the twelve remaining areas. Various ramifications of the arrangement will be best understood from the description which follows.

Device 30 provides, therefore, one of the photographing stations 31, and the copy platen 32 at the bottom of photographing section 12 provides the other photographing station 33. Copy platen 32 is of the well-known type in which the document is positioned on a perforated plate and, upon actuation of treadle 15 by the operator, a glass plate is positioned over the document and a vacuum is applied to the perforated plate whereby the document is held flat in the copy plane. Lamps 34 are mounted within photographing section 12 for illuminating the copy plane. In device 30, the aperture which provides the pattern of light comprises the photographing station 31, device 30 being arranged above and to one side of the field for photographing station 33.

The supply reel 40, see Figs. 2, 3 and 12, for film F is mounted on spindle 41 and take-up reel 42 is mounted on spindle 43 which is driven in a manner to be described hereinafter. Film F is threaded around roller 44, between notching device 45, against film carriage 46, between clamping device 47, around roller 48 and to take-up reel 42. Exposure station 49 comprises plate 50 of carriage 46 against which the film is maintained as it is moved with respect to aperture 51, said station being in a plane perpendicular to the plane in which the pattern of light is positioned in device 30 and parallel to the plane in which the document is positioned.

Figure 12:
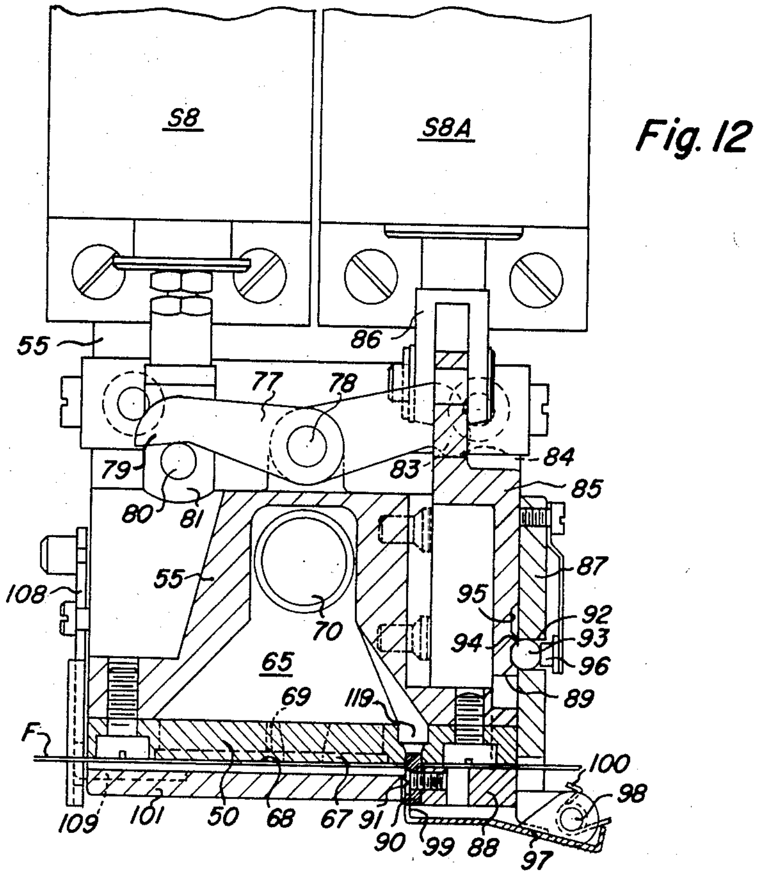
Figs. 12 and 13 are detail sectional views through the film carriage means and showing the arrangement of the perforating punch and the error-notch punch.
Figure 13:
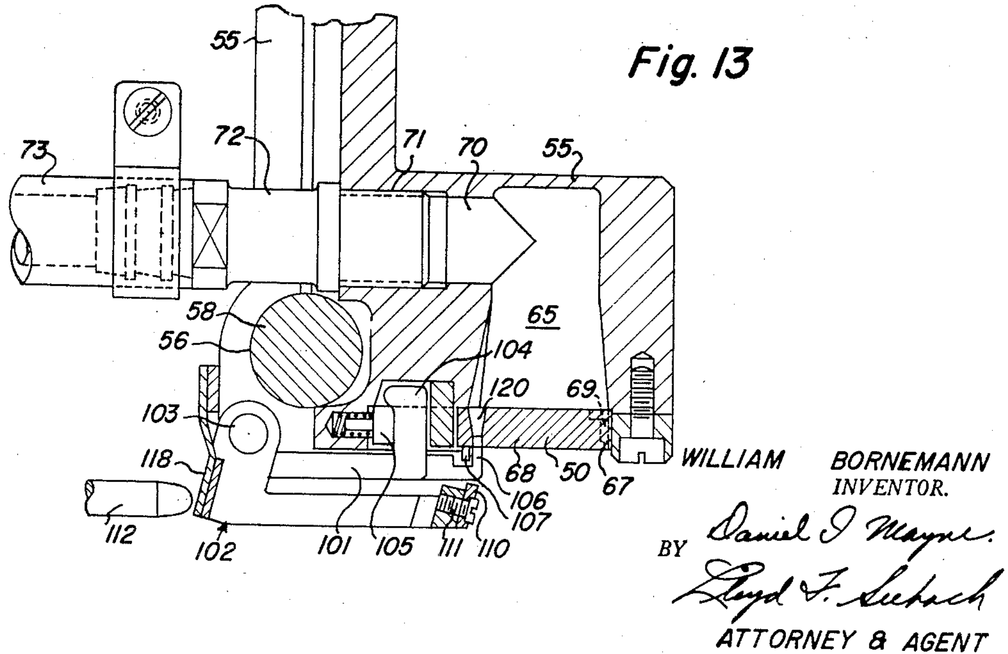
Figure 14:
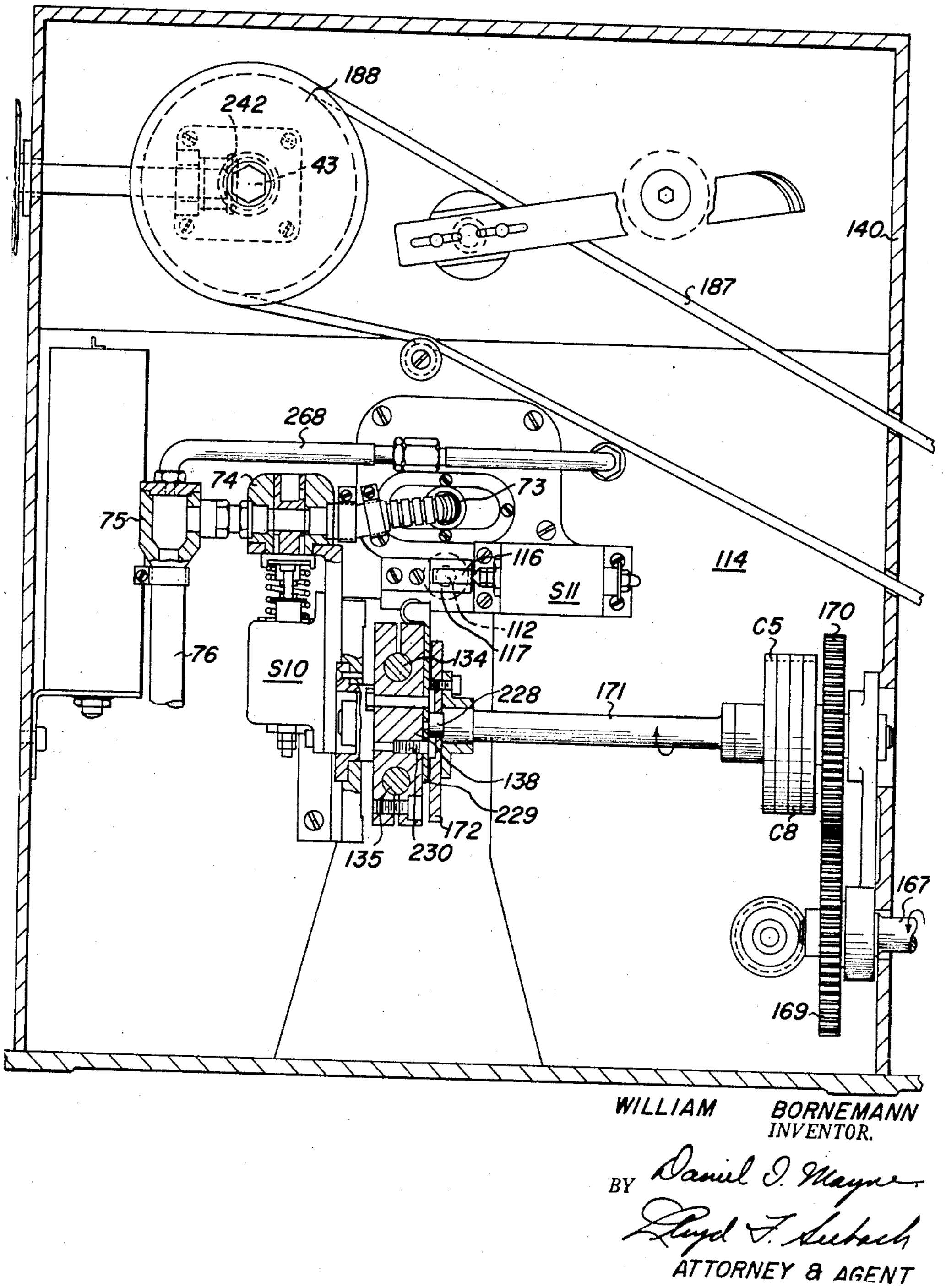
Fig. 14 is a rear elevation partially in section of the drive means for the optical carier means and the control valve for the vacuum lines.

Film carriage 46, see Figs. 12, 13 comprises a member 55 which is provided with vertically spaced apertures 56 at the rear thereof for receiving spaced rods 57 and 58 and which is secured thereto for movement therewith. At one end, rods 57 and 58 are secured together by the tie-bar 59 and, on each side of member 55, are slidable in bearings 60 and 61. On the other end, rod 58 is received by a sleeve 62 having a button 63 which is urged against the rod by spring 64. Member 55 is provided with a chamber 65 which is covered by plate 50 provided with grooves 67 on the film engaging surface 68 and apertures 69 connecting said grooves with chamber 65. Chamber 65 is connected by aperture 70 to a threaded opening 71 in which connector 72 is seated. Flexible hose 73, see Fig. 14, is arranged between valve 74 and connector 72, valve 74 being connected on the other side to connector 75 which is joined to line 76 connected to a vacuum pump, not shown. Valve 74 is actuated by solenoid S10 in a manner to be described hereinafter.

Above chamber 65, see Figs. 12 and 13, link 77 is pivotally mounted at 78 intermediate its ends, one end 79 engaging pin 80 on armature 81 of solenoid S8 and the other end 83 engaging slot 84 in member 85 which is connected to armature 86 of solenoid S8A. Solenoids S8 and S8A are mounted in side-by-side relation on member 55. Member 85 is slidably mounted with respect to member 55 and fixed plate 87 and has an L-shaped extension 88 and a vertical notch 89 which provides clearance for film F, extension 88 carrying perforating member 90 which is secured thereto by screw 91. Plate 87 is provided with an aperture 92 in which ball 93 is retained in engagement with one of notches 94 or 95 by the resiliently biased pin 96. Plate 87 carries a member 97 which is pivotally mounted thereon at 98 and is provided with two spaced and upstanding lugs 99 which are biased toward plate 50 by spring 100. In Fig. 12, member 85 is shown in the position in which perforating member 90 has passed through film F and lugs 99 are maintained in engagement with the film. Upon energization of solenoid S8, pin 80 rotates ends 79 and 83 clockwise and member 85 is moved downwardly to withdraw perforating member 90 from the film. Lugs 99 hold the film to prevent movement thereof with perforator 90 and are released when extension 88 abuts member 97 and moves it therewith about pivot 98. Member 85 is then retained in the withdrawn position by engagement of ball 93 with notch 95. When solenoid S8A is energized, member 85 is moved upwardly; however, before perforator 90 engages the film, it is engaged by lugs 99 and held against plate 50 to prevent any slippage thereof upon engagement by perforator 90. In the event preperforated film is used, perforator 90 can be replaced by a locating pin which is actuated into position in the same manner and with the exception of perforating the film accomplishes the same result with respect to advancing the film.

Figure 15:
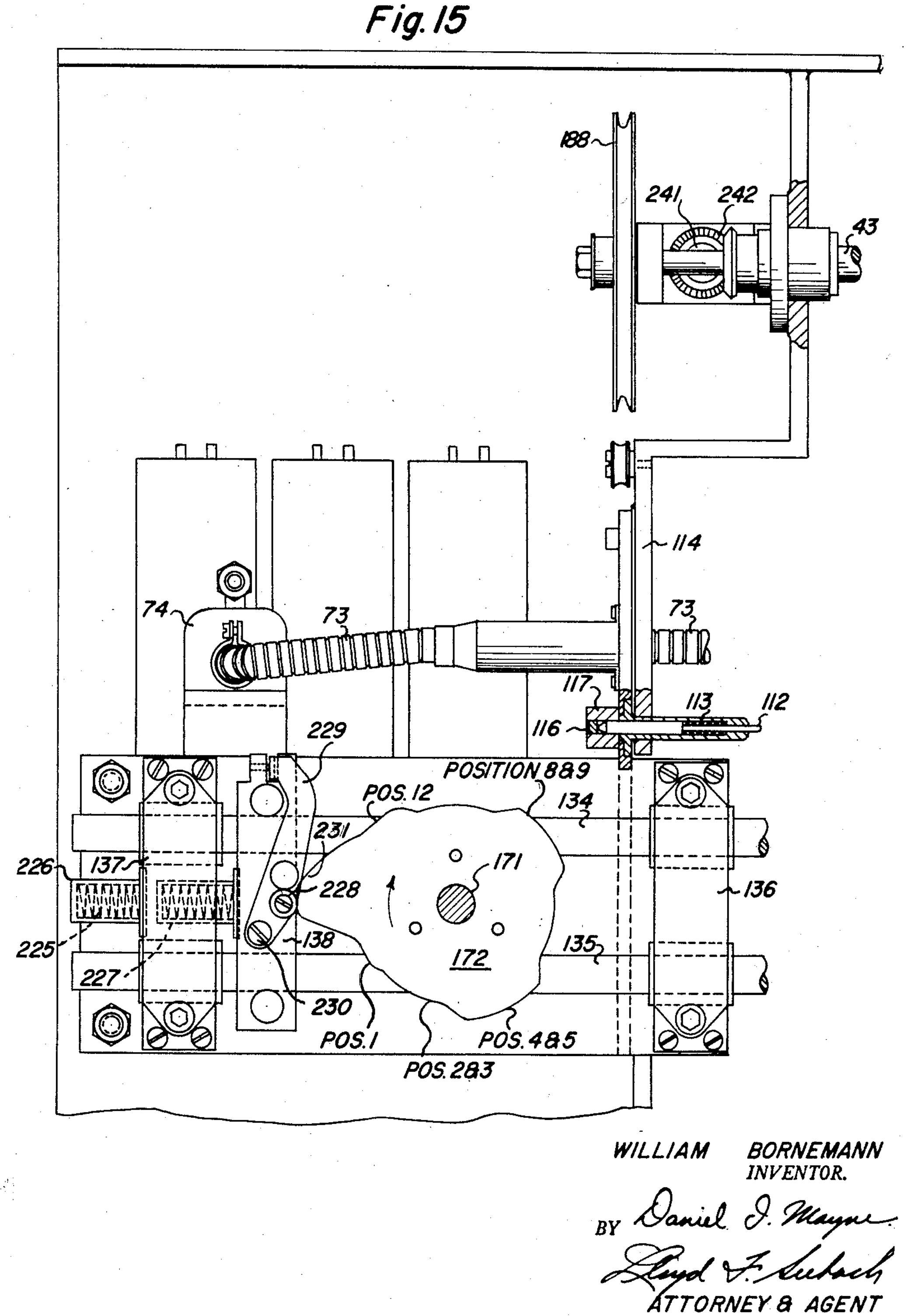
Fig. 15 is a side elevation of the actuating means for the optical carrier means.

At the lower rear end of member 55, see Fig. 13, holding member 101 and an error-notching device 102 are pivotally mounted on the common shaft 103 which is journaled in member 55. Holding member 101 is provided with an upstanding latching lug 104 which engages the spring biased pin 105 in member 55 and with a longitudinal lip 106 for engaging the film F on plate 50 adjacent edge guide 107 formed on plate 50, lug 104 and a spring on shaft 103 maintaining holding member 101 in the position shown in Fig. 13. In order to place the film with respect to plate 50 and edge guide 107, arm 108, see Fig. 12, which is pivotally mounted on member 55 has a portion 109 secured to member 101 for pivoting it on shaft 103 to a position in which lip 106 is removed from plate 50, thereby also moving latching lug 104 out of engagement with pin 105 and against the action of the spring on shaft 103. The error-notching device 102 is pivotally mounted on shaft 103 between the mounting portions of holding member 101 and carries at the forward end thereof notching blade 110 which is secured by screw 111. Device 102 is pivoted about shaft 103 by pin 112 which is slidably mounted in sleeve 113 fixed to wall 114 and is actuated by solenoid S11 through bell crank lever 116 pivotally mounted on bracket 117, as shown in Figs. 14 and 15. Device 102 is provided with an actuating portion 118 which permits movement thereof with carriage means 46 and with respect to pin 112 so that a notch can be provided at the same point with respect to aperture 23 in the film F, actuating portion 118 being of sufficient length to permit contact of pin 112 therewith irrespective of the position of carriage means 46 with respect to the exposure station. Whenever an error in photographing is made, the operator actuates switch ES thereby energizing solenoid S11 by connecting it across lines 293 and 294, see Fig. 19, and moving pin 112 against portion 118 which, in turn, moves notching blade 110 against film F. Since notching device 102 moves with the film, the error indicating notch will always be made in the same relative position with respect to its aperture 23. From Figs. 12 and 13 it will be noted that plate 50 is provided with openings 119 and 120 which are located therein for receiving perforating member 90 and notching member 110 and that said openings connect to chamber 75 so that the pieces of film are drawn by the vacuum into the chamber and then into hoses 73 and 76.

Figures 6, 16:
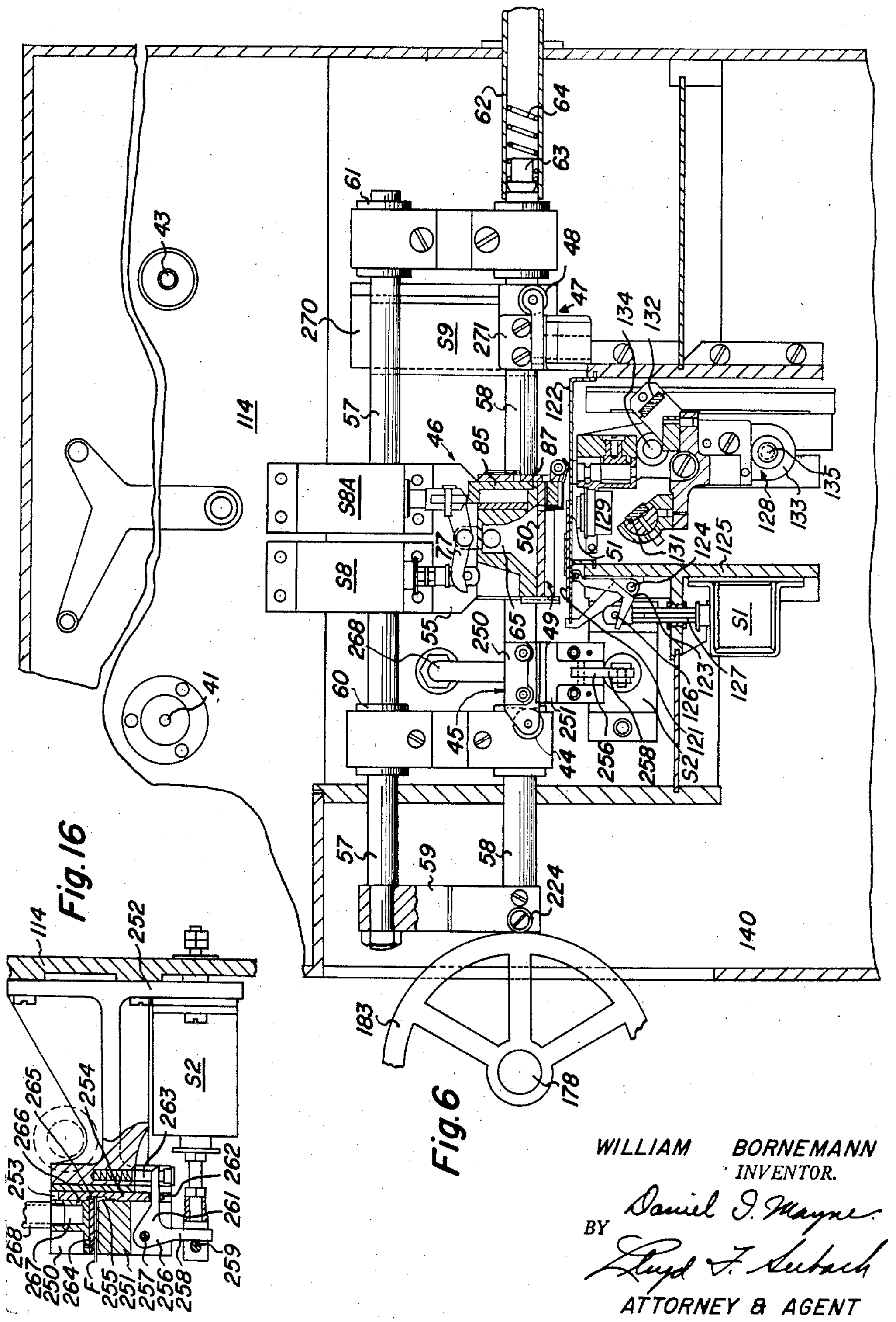
Fig. 6 is a front elevation, partially in section, of the arrangement of the film carriage, shutter actuating means, and a portion of the optical system for the apparatus.
Fig. 16 is a vertical section through the notching device for the leader and trailer ends of the film strip.

Arranged above aperture 51, as shown in Fig. 6, is shutter 121 which is a plate-type shutter slidably mounted on fixed plate 122 in which aperture 51 is provided. Shutter 121 is actuated by bell crank lever 123 which is pivotally mounted at 124 on wall 125, one arm being pivotally connected to shutter 121 and the other arm being engaged by pin 126 carried on the armature 127 of solenoid S1.

Beneath plate 122, see Fig. 6, a carrier means 128 is provided for projection lenses 129 and 130, mirror 131 and mirror 132. Carrier means 128 comprises a unitary member 133 which is secured to vertically spaced rods 134 and 135 and which is movable therewith in a manner to be described hereinafter, said rods being slidably mounted in bearings 136 and 137 and secured together by the tie bar 138, see Figs. 14 and 15. Since each line of code on element 20 extends across the entire code area 21 whereas two document images are arranged transversely of the element, lens 129 must be positioned centrally of the film F and lens 130 must be offset with respect to the center of film F and to the position normally assumed by lens 129. Mirrors 131 and 132 are properly positioned in a fixed relation to lens 129 on member 133 so that the three elements are moved with respect to the fixed mirror 139 associated with target device 30. Carrier means 128 is, therefore, movable between a normal position in which the pattern of light presented by device 30 in photographing station 31 is imaged on the film F by means of mirrors 139, 132 and 131 and projection lens 129 in code area 21, a position in which lens 130 is arranged with respect to exposure station 49 for imaging a document in photographing station 33 along one side of the document image area 22, and a position in which lens 130 is arranged with respect to exposure station 49 for imaging documents in photographing station 33 along the other side of document image area 22. The means for accomplishing the necessary movement of carrier 128 will be described hereinafter.

Figures 8, 17, 18:
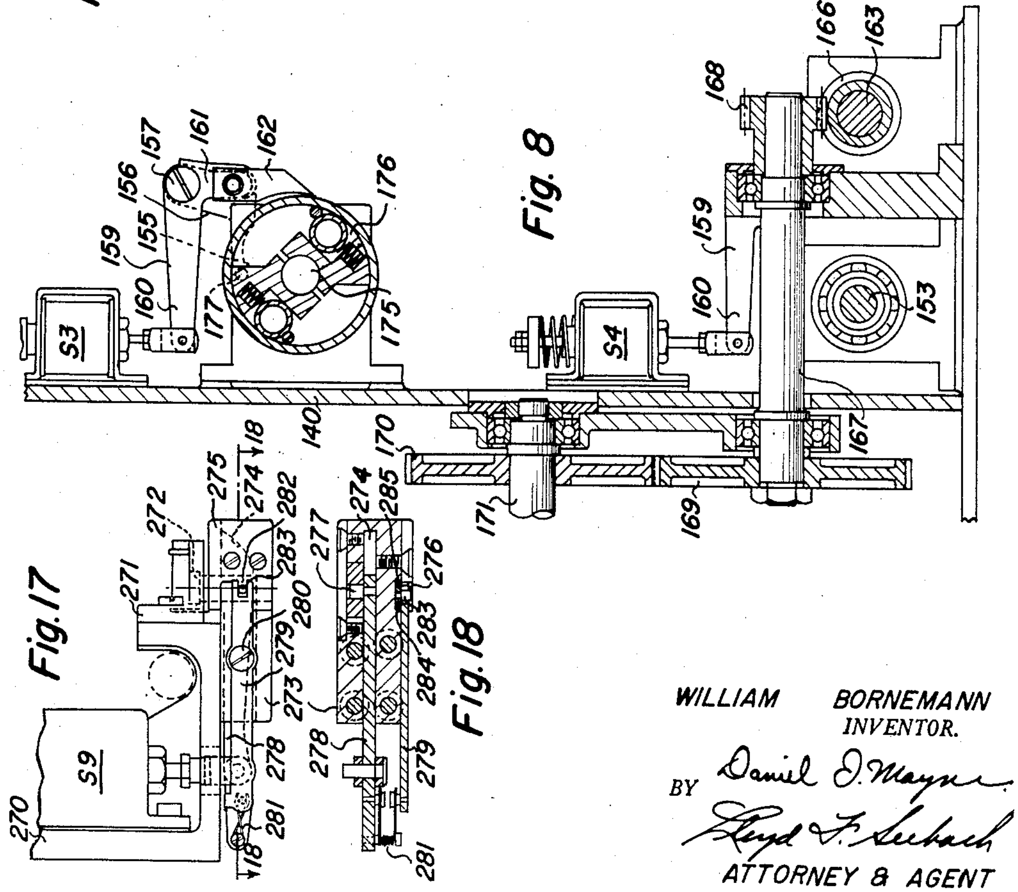
Fig. 8 is a sectional view taken substantially along line 8—8 in Fig. 9 and showing the drive take-off for the lens carrier cam and the clutch for the pawl and ratchet mechanisms.
Fig. 17 is a side elevation of the holding means which prevents retrograde movement of the film.
Fig. 18 is a sectional view taken substantially along line 18—18 in Fig. 17.
Figure 9:
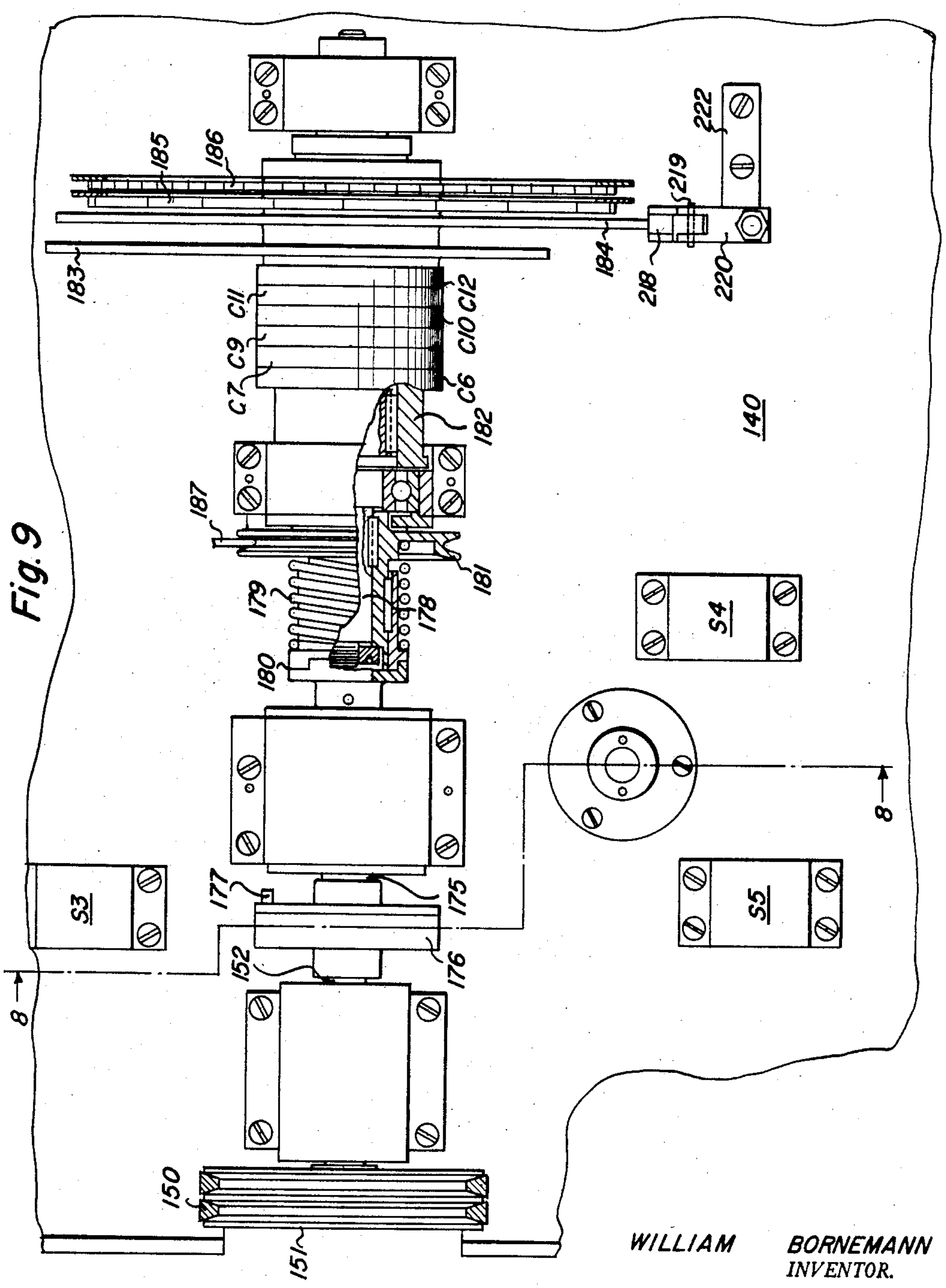
Fig. 9 is a side elevation partially in section of the ratchet drive shaft.
Figures 10, 11:
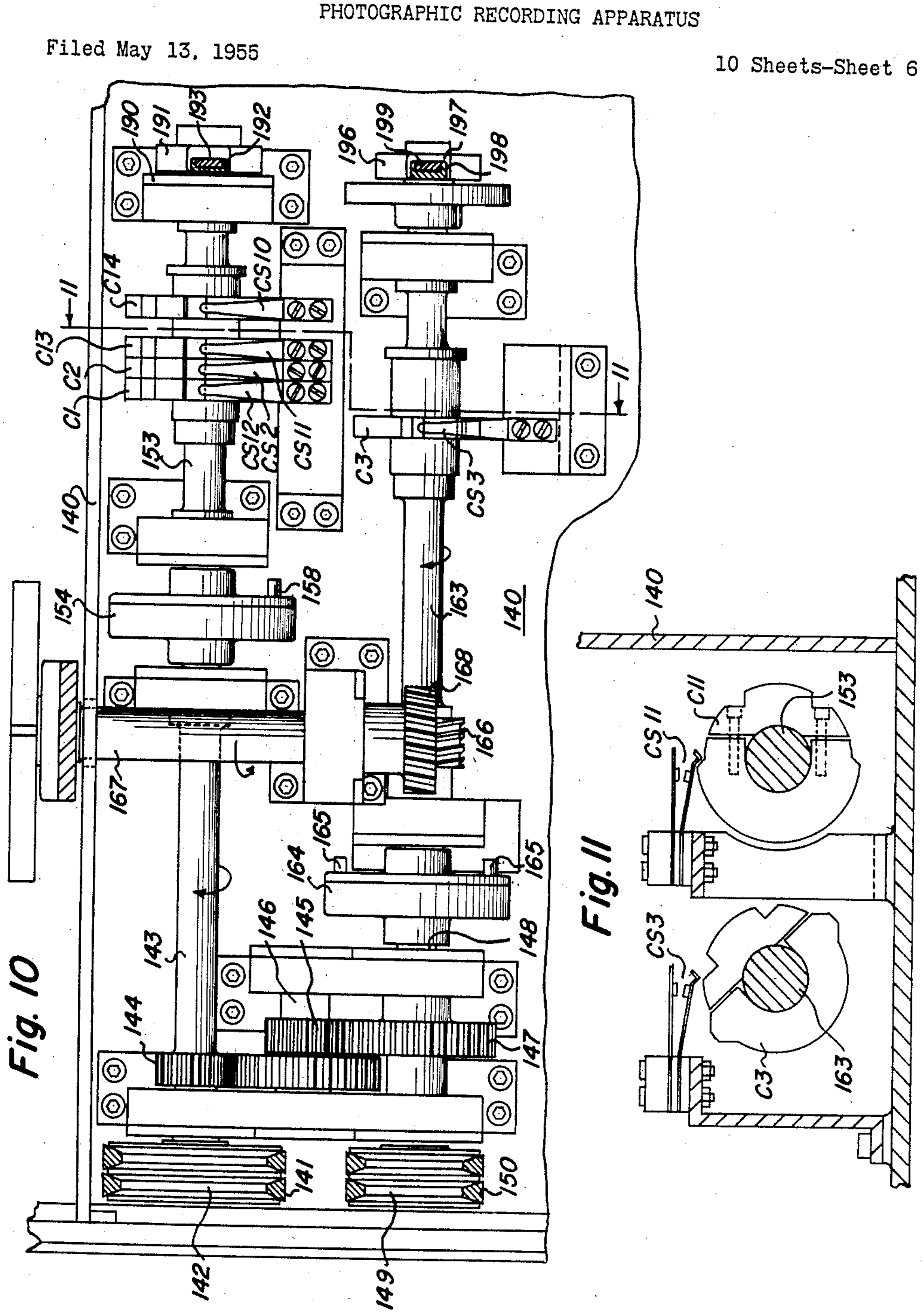
Fig. 10 is a plan view of the control shafts for the advancement of the light-sensitive material and the positioning of the optical means with respect to the exposure station.
Fig. 11 is a detail sectional view taken substantially along 11—11 in Fig. 10 and showing two of the cam-actuated contacts associated with the control shafts.

Adjacent wall 140, see Figs. 9 and 10, the means for supplying the necessary movement to carriage means 46 and to carrier 128 is arranged. Such means includes a driving means or motor M which is connected by double belt 141 to pulley 142 fixed to shaft 143. By means of gear 144 fixed to shaft 143, intermediate gears 145 fixed to shaft 146, and gear 147 fixed to shaft 148, shaft 148 is rotated and through pulley 149, belt 150 and pulley 151 shaft 152 is also rotated, the respective pulleys and gears being in ratios to drive the shafts at the necessary predetermined speeds with respect to one another. Shaft 143 is coupled to shaft 153 by means of clutch 154, as shown in Fig. 8, which is retained in disengaged relation by arm 155 of lever 156 which is pivotally mounted at 157 and positioned in the path of pin 158. Lever 156 is movable with bell crank lever 159 also pivotally mounted at 157 and having an arm 160 thereof connected to the armature of solenoid S4 and other arm 161 carrying a brake member 162 for engaging the portion of clutch 154 rotatable with shaft 153, see Fig. 8. Fixed to shaft 153 for rotation therewith are cams C1, C13 and C14 which actuate contacts CS1, CS13 and CS14, respectively, to a closed position for purposes to be described hereinafter. Shaft 148 is coupled to shaft 163 by means of clutch 164 which is provided with two diametrically spaced pins 165 and is retained in disengaged relation by a linkage identical to that already disclosed with respect to clutch 154 and is actuated by solenoid S5 to release said clutch. Solenoids S3, S4 and S5 are mounted on wall 140, as shown in Fig. 9. Shaft 163 has cam C3 fixed thereto and said cam actuates contacts CS3. Also fixed to shaft 163 is worm gear 166 which rotates shaft 167 by means of worm wheel 168. Shaft 167 through gears 169 and 170 rotates shaft 171 to which is secured cam 172. Shaft 152 is coupled to shaft 175 by clutch 176 which is provided with a single pin 177 and is retained in disengaged relation by a linkage actuated by solenoid S3 to release said clutch, this linkage also being identical to that associated with clutches 154 and 164. Shaft 175 is coupled to shaft 178 which is aligned therewith by a tendency drive comprising coil spring 179 which is secured at one end to the portion of clutch 180 which is keyed to pulley 181 and at the other end to pulley 181 which is keyed to shaft 178. Sleeve 182, which is also keyed to shaft 178, carries cams C6, C7, C9, C10, C11 and C12 which actuate their respective contacts CS6, CS7, CS9, CS10, CS11 and CS12. Also keyed to sleeve 182 are cam 183, indexing plate 184 and ratchets 185 and 186. By means of belt 187, pulley 181 drives pulley 188 on the take-up reel spindle 43.

Figure 7:
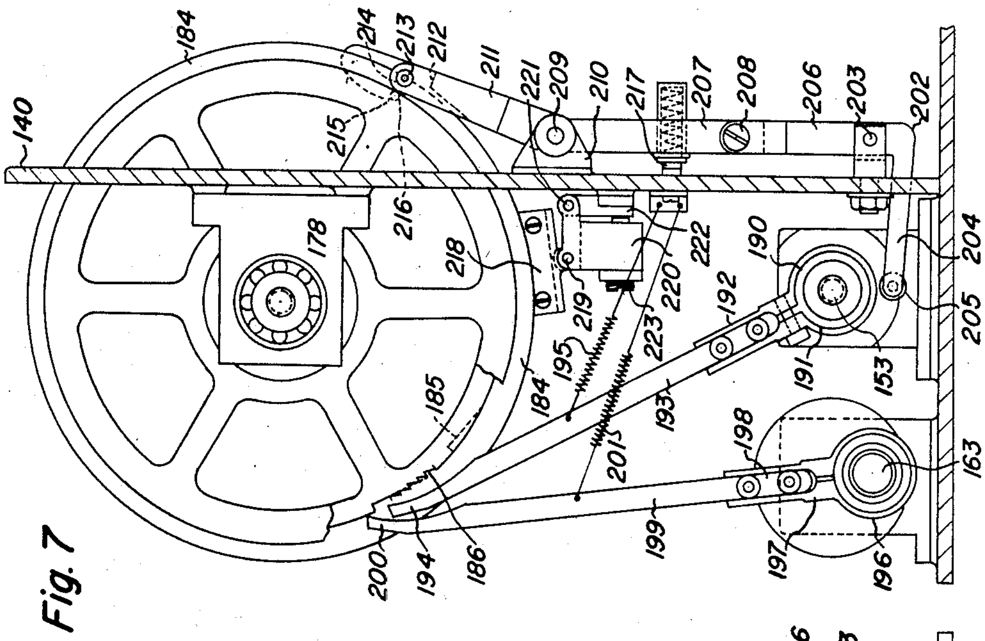
Fig. 7 is an end elevation of the pawl and ratchet mechanisms for intermittently advancing the light-sensitive material.

Shaft 153 has mounted thereon a plate 190 to which an arm 191 is eccentrically and pivotally mounted. Arm 191 is provided with a U-shaped channel portion 192 in which an extension 193 is clamped, extension 193 being provided with a nose 194 for engaging the teeth on ratchet 186 and being maintained thereagainst by spring 195, see Figs. 7 and 10. In a similar manner, a plate 196 is secured to shaft 163 and arm 197 is eccentrically and pivotally mounted thereon. Arm 197 is provided with a U-shaped channel portion 198 to which extension 199 is secured, extension 199 having a nose 200 for engaging the teeth of ratchet 185 and being maintained thereagainst by spring 201.

Bell crank lever 202 is pivotally mounted at 203 and is provided with one arm 204 normally arranged below plate 190 which carries a roller 205 and a second arm 206 which is pivotally connected to link 207 at 208. Link 207 is fixed to shaft 209 pivotally mounted in bracket 210 on wall 140. Latch member 211 is also fixed to shaft 209 and is provided with a slot 212 in which index plate 184 rotates. Pin 213 is mounted in the slot of latch member 211 and engages notch 214 in the periphery of index plate 184. Adjacent notch 214, pin 215 on plate 184 serves to cam latch member 211 outwardly until notch 214 is opposite pin 213 at which time pin 215 also seats in notch 216 in member 211. Notch 214 and pin 213 serve to retain index plate 184 in a zero or start position. As shaft 153 is rotated, the eccentricity of arm 191 in one position will result in rotating lever 202 about its pivot 203 in a counter-clockwise direction, thereby rotating link 207, shaft 209 and latch member 211 in a clockwise direction to free pin 213 from notch 214 to permit rotation of index plate 184. These same parts are returned to their normal position by the spring biased plunger 217 on link 207 and which engages wall 140. In order to prevent retrograde movement of index plate 184, cam 183 and the ratchets 185 and 186, brake shoe 218 is pivotally mounted at 219 on bracket 220 which, in turn, is pivotally mounted at 221 to bracket 222 on wall 140. By adjustment of screw 223, the amount of friction applied to the periphery of index plate 184 can be varied.

Cam 183 extends through wall 140 and the periphery thereof engages roller 224 mounted on tie bar 59, see Fig. 6. As stated hereinbefore, an image area on film F is equivalent longitudinally of the film to ten rows of code. Accordingly, ratchet 185 can be designated as the "image" ratchet in that one ratchet tooth is equivalent to ten teeth on "code" ratchet 186. When shaft 153 is coupled to shaft 143, one revolution thereof results in arm 183 being moved into engagement with ratchet 186 whereby cam 183, index plate 184, and ratchets 185 and 186 are moved the equivalent of one ratchet tooth. This movement is transmitted to carriage means 46 by cam 183 whereby rods 57 and 58 and member 55 are moved as a unit to the right a distance equivalent to the width of a line of code. Due to the connection between pulley 181 and clutch 180, the movement of ratchet 186 is imparted to shaft 178 through sleeve 182 which, in turn, causes pulley 181 and the portion of clutch 181 connected thereto to turn, the portion of clutch 181 associated with shaft 178 being moved relative to its portion fixed to shaft 175. When shaft 163 is coupled to shaft 148, arm 199 is moved toward ratchet 185 and nose 200 advances cam 185, cam 183 and index plate 184 the equivalent of one tooth or ten times the movement imparted thereto by arm 193 to ratchet 186. Due to the connection between shafts 175 and 178, ratchets 185 and 186 rotate cam 183 and index plate 184 independently of shafts 152 and 175. In the same manner, the film F is advanced by cam 183 which moves carriage means 46 with respect to exposure station 49. At the time shaft 163 is coupled to shaft 148, worm gear 166 is rotated and its movement is imparted by means of worm wheel 168, shaft 167, gears 169 and 170, and shaft 171 to cam 172. Spring 225 positioned between sleeve 226 on bearing 137 and sleeve 227 on tie-bar 138 maintains follower roll 228 on link 229 which is pivotally mounted on tie bar 138 at 230 in engagement with the periphery of cam 172, see Fig. 15.

The position in which cam 172 is shown in Fig. 15 is the normal position wherein carrier means 128 positions lens 129 and its associated mirrors 131 and 132 with respect to exposure station 49 for imaging the successive patterns of light presented by device 30. In this position portion 231 engages roller 228. However, when documents are to be photographed, cam 177 is rotated clockwise and spring 225 urges tie bar 138, rods 134 and 135, and member 133 forward as well as carrier means 128 to position lens 130 with respect to exposure station 49 and film F. With respect to film strip F shown in Fig. 4, it will be noted that the code area 21 and image area 22 are of different size for each element. Starting at the right, the first element has ten lines of code and twelve document images and the second element has twenty lines of code and ten document images. In each of these two elements the code areas are equivalent in width; that is, measured longitudinally with respect to film F, to one and two document images, respectively. However, as shown by the two succeeding elements, the code on the third element occupies more than one document image width but less than two and in the partial fourth element the code occupies more than two document widths but less than three. In both of these latter elements, the document images are arranged in the same relation as in the first two elements. This is accomplished by the relation of ratchets 185 and 186 which are mounted on shaft 178 so the first tooth or ratchet 185 is aligned with one on ratchet 186, the second tooth on ratchet 185 then being aligned with the eleventh tooth on ratchet 186. As will be described hereinafter with respect to the control circuits for the device, when recording is switched from photographing station 31 to photographing station 33, shaft 163 is coupled to shaft 148 and arm 199 is moved to rotate ratchet 185, thereby rotating cam 183 and moving the film with respect to exposure station 49. In other words, if less than ten increments of film are advanced by arm 193 and ratchet 186, arm 199, which is normally retained in its withdrawn position, cannot engage the next tooth on ratchet 185 and, hence, the first portion of its movement to advance film is lost because the tooth that it should engage has been moved with ratchet 186. However, during its further movement the tooth is picked up and the film is then advanced the remaining increments by the single movement. When ten lines of code or a multiple thereof are imaged on film F, nose 200 on arm 199 still lies on the land of the tooth and its advancing movement fails to engage a tooth for advancing film. However, on its return stroke, nose 200 falls behind the succeeding tooth for advancing the next increment of film for recording a document image. The drive means disclosed in Figs. 7–10 provides, therefore, an intermittent drive means for advancing film F past exposure station F in a predetermined increment or a predetermined multiple of said increment.

At the same time shaft 163 is coupled to shaft 148, rotation of cam 172 in a clockwise direction, see Fig. 15, permits movement of carrier 128 in that spring 225 urges tie bar 138 and follower roll 228 against the periphery of cam 172. Roller 228, therefore, is moved into engagement with the surface of cam 172 designated position 1. In this position carrier means 128 is positioned so lens 130 is aligned with exposure station 49 and the area designated by 1 in Fig. 4. Inasmuch as pins 165 are diametrically spaced on clutch 164, shaft 163 is permitted to make only one-half a revolution each time clutch 164 is released. As a result, arm 199 is moved to advance film F during the first half of the revolution and withdrawn during the next half of the revolution. However, cam 172 is rotated with each coupling of shaft 163. Therefore, on the return stroke of arm 199, cam 172 is rotated so roller 228 engages the surface designated position 2 and 3. Lens 130 is then aligned with the image area designated by 2 in Fig. 4. On the next coupling, arm 199 rotates ratchet 185 and cam 183 to advance film and although cam 172 is rotated, roller 228 retains its same position on the periphery of cam 172 and lens 130 is then aligned with the area designated by 3 in Fig. 4 due to the film advance. With the next coupling, arm 199 is withdrawn, cam 183 is not rotated, cam 172 is rotated and roller 228 is then moved rearwardly by the portion of cam 172 designated position 4 and 5 to position lens 130 in the same position it was previously located. From the foregoing description it is evident that carrier means 128 is moved intermittently between two positions when arm 199 is being withdrawn and is stationary during the interval arm 199 is moved for rotating cam 183 thereby advancing film F. Irrespective of the number of lines of code on any element, lens 130 always assumes the same position for the first exposure. In the event a number of exposures less than the maximum number provided for is used, the same cycle of operation is followed and, upon completion of an element, cam 172 is automatically returned to its zero position in which position portion 231 again engages roller 228 whereby carrier means 128 is moved to position lens 129 with respect to exposure station 49. In the disclosed embodiment, cam 172 is shaped to provide only twelve document images, it being assumed that at least one line of code will be imaged on each element. While the structure disclosed will permit seventy lines of code, by merely replacing cam 172 with a similar cam having portion 231 removed and suitable surfaces provided therefore, exposure of fourteen document images can be made. Also cam 172 can be designed to provide a different number pattern of document images, such as the odd numbered exposures on one side and the even numbered on the other side. It is also feasible to provide two cams on shaft 171, one for code exposures and one for document exposures, and which can be selectively positioned with respect to roller 228, thereby providing means for making only code exposures, or both, which can then be arranged in any order on each element.

With reference to Fig. 1, hand wheel 240 on the outside of film unit 13 is connected to take-up reel spindle 43 by a chain and sprocket drive, one sprocket being shown in Fig. 14 on shaft 241 which drives spindle 43 through mitre gears 242. On the front of film unit 13 a footage indicator 243 is arranged and is connected in any suitable manner to a measuring member associated with the supply reel 40. An adjustable exposure timer 244 is controlled by knob 245 arranged to one side of door 246 which can be opened for inserting, threading and removing film F.

To the left of carriage means 46 in Fig. 6, film F passes between members 250 and 251 mounted on bracket 252, as shown in Fig. 16. Slidably mounted in an aligned recess 253 provided in members 250 and 251 is a notching blade 254. The cutting edge 255 of blade 254 is recessed in the blade. Bell crank lever 256 is pivotally mounted at 257 in a slot in member 251 and has one arm 258 in engagement with pin 259 on the armature of solenoid S2. The other arm 261 of lever 256 is in engagement with a slot in the end of blade 254 and pin 262 carried thereby. The resiliently biased stud 263 which also engages arm 261 maintains lever 256 and blade 254 in an inoperative position. Roller 44 which is carried by bracket 252 also serves to maintain film F against plate 264 or member 250, the plate being provided on its inner edge with a notch 265 which cooperates with cutting edge 255. Upon energization of solenoid S2 by switch LTS in line 302, lever 256 is rotated counterclockwise, thereby moving blade 254 vertically in recess 253. The edge of film F is notched during this movement and the further movement of blade 254 carries the severed piece of film vertically till it is opposite aperture 266 which communicates with chamber 267 in member 250. Vacuum line 268 is connected to chamber 267 from connector 75 on the rear side of wall 114 and removes the notched portion of film to line 76. This notching device is utilized at the start and finish of each reel of film F to provide an actuating portion as a control associated with the apparatus for severing the strips into individual elements after processing.

To the right of carriage means 46 as shown in Fig. 6 the film holding device 47 is arranged. Holding device 47, see Figs. 17 and 18, comprises a bracket 270 fixed to wall 114 and carrying solenoid S9 thereon. Secured to the front portion of bracket 270 is a right angle member 271 which carries roller 48 and which is provided with a rectangular slot 272. On the under side of bracket 270 plate 273 is mounted and is provided with a longitudinal recess 274. To the top of plate 273. L-shaped film supporting plate 275 is secured and is provided on one side with a recess 276, plate 275 and member 271 being spaced apart to permit film F to pass therebetween. Pivotally mounted at 277 and in recess 274 is a link 278 which is pivotally connected at the other end to the armature of solenoid S9. A second link 279 is pivotally mounted intermediate its ends at 280 on the side of plate 273, one end thereof being connected to an extension of link 278 by a spring 281. The other end of link 279 is slotted at 282 and engages pin 283 on holding lug 284 which is slidably mounted in recess 285 in the side of plate 273. Holding lug 284 is aligned with slot 272 and is positioned with respect to the carriage means 46 so that when carriage means 46 is in its extreme position to the right, in which position the last exposure has been made and the necessary movement of film has been made for providing the required length, aperture 23 of the preceding element completed is then aligned with lug 284 and slot 272. At the instant perforator 90 is released from the film and the vacuum is shut off, solenoid S9 is is energized. Link 278 is then moved downward and its motion is transmitted to link 279 through spring 281 and holding lug 284 is moved upward to engage aperture 23 in film F which is aligned therewith. By this means any retrograde movement of film F due to the movement of carriage means 46 to its extreme left or "zero" position is eliminated. When carriage means 46 is in its "zero" position, solenoid S9 is deenergized and lug 284 is withdrawn from the aperture in the film. In order to compensate for slight misalignment of aperture 23 in the film with slot 272 and lug 284, the end of lug 284 can be tapered to facilitate entry thereof. In the event the misalignment is of such a degree as to prevent entry of holding lug 284, spring 281 is of such proportions as to prevent forcing of location of the film by the resistance offered to the upward movement of lug 284, thereby also preventing tearing or destruction of the film.

Figure 19:
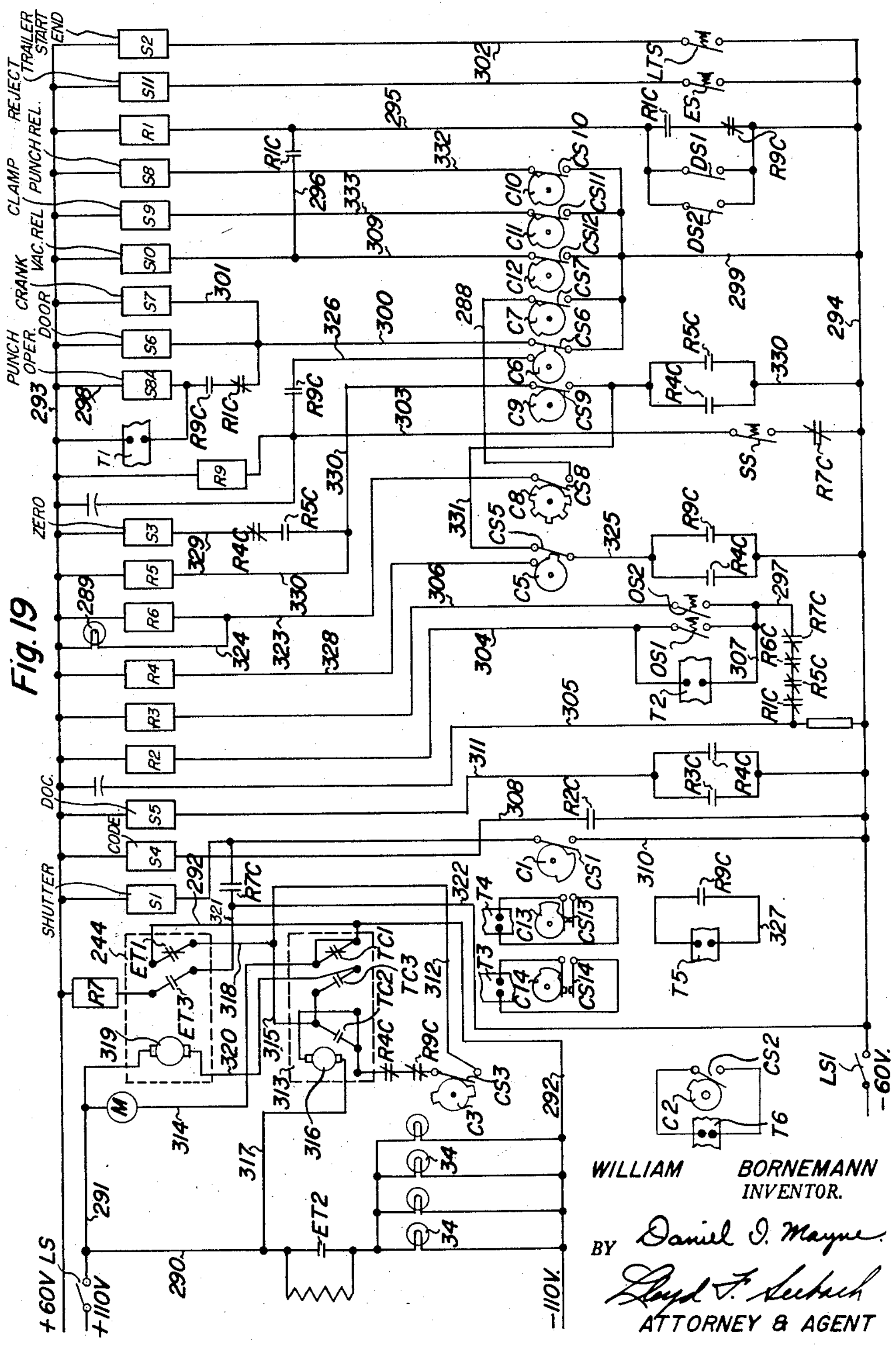
Fig. 19 is a wiring diagram showing the electrical controls for controlling the sequential operation of the recording device.

The sequential operation and control of the various elements can best be understood by a description thereof in conjunction with the circuits and wiring diagram of Fig. 19. If line switches LS and LS1 are closed, lamps 34 are energized by line 290 across lines 291 and 292, the resistance in line 290 permitting only a small voltage to be applied to the lamps. Door 246 is then opened which closes switch DS1 and connects relay R1 across lines 293 and 294 by line 295. Relay R1, upon being energized closes its contacts R1C in lines 295 and 296 and opens its contact R1C in lines 297 and 298, and by means of lines 295, 296 and 309 solenoid S10 is energized. Solenoid S10, see Fig. 14, actuates valve 74 to connect the vacuum to the atmosphere. Door 246 cannot be opened unless carriage means 46 is in its zero position and switch LS is closed, because only then is cam C6 in a position to complete the circuit through solenoids S6 and S7, said solenoids being connected across lines 293 and 294 by line 299, contact CS6 in line 300 and line 301. Supply reel 40 is then placed on spindle 41 and the film F is threaded around roller 44, between members 250 and 251, beneath plate 50 and against edge guide 107, between plates 273 and 275, around roller 48 and to take-up reel 42 on spindle 43. Door 246 is then closed, thereby opening switch DS1. Relay R1 is, however, still energized by the circuit through its contact R1C in line 295. Switch LTS in line 302 is then closed momentarily to connect solenoid S2 across lines 293 and 294 for actuating blade 254 in notching device 45 to notch the leader end of film F, see Fig. 16. Handwheel 240, which is connected to spindle 43 by gears 242, is then turned to wind a leader length of film onto reel 42. The turning of handwheel 240 closes switch DS2 across switch DS1 but this has no effect in that the circuit is still closed by means of contact R1C in line 295. After a length of film has been wound on reel 42, switch DS2 again opens and film unit 13 is now conditioned for exposing film F.

Switch SS in line 303 is now actuated, thereby connecting relay R9 across lines 293 and 294 to open its contact R9C in line 295 by which the circuit through relay R1 is broken and to close its contact R9C in line 298 by which solenoid S8A is energized by means of line 299, contact CS6 and line 300. Contact R1C in line 296 causes solenoid S10 to be deenergized which then returns to a position in which the vacuum is applied to hose 73 and line 268. The vacuum applied to hose 73 serves to draw film F against the bottom of plate 50 by means of the apertures 69 leading to grooves 67 in the film engaging surface 68. Energization of solenoid S8A moves member 85 upward so perforator member 90 perforates aperture 23 in film F and is retained in this position by ball 93 engaging notch 94, as shown in Fig. 12. Switch OS1 in line 304 is then closed and relay R2 is energized by means of line 305, contacts R1C, R5C, R6C and R7C in line 297 and line 307 thereby closing its contact R2C in line 308 which then connects solenoid S4 across lines 293 and 294. Energization of solenoid S4 actuates its respective lever 156 to move lever 159 out of the path of pin 158 on clutch 154. Shaft 143 is then coupled to shaft 153 and cams C1, C2, C13, and C14 are rotated therewith. Cam S2 actuates its contact CS2 to a closed position to wipe out any pattern of code set up in device 30. With the opening of CS2, cam C14 opens its contact CS14 to clear the circuit for device 30 in order to start reading of the tape, and cam C13 closes its contact CS13 to again initiate the tape reader associated with device 30 for setting up the pattern of code for the first line to be recorded on film F. Plate 190 is also rotated and on the first portion of its rotation arm 193 is withdrawn releasing pin 213 from notch 214 in index plate 184 by means of lever 202 and link 203 and is then returned with nose 194 engaging ratchet 186. When arm 193 returns to its initial position, lever 159 is then in the path of pin 158 and shaft 153 becomes disengaged from shaft 143, brake member 162 preventing any rebound upon engagement of lever 159 and pin 158. As ratchet 186 is rotated by the upward movement of arm 193 and nose 194 is in engagement with a ratchet tooth, cam 183 is rotated a very small amount therewith and its movement is imparted to carriage means 46 by roller 224. Since a vacuum is applied to chamber 65 and acts upon the portion of film F in engagement with plate 50 and perforating member 90 is in engagement with aperture 23 in the film, the film is movable with carriage means 46 and, hence, the movement imparted thereto by cam 183 is also imparted to film F to move it with respect to exposure station 49. During the interval arm 193 is being moved to its initial position, i.e., after film F has been advanced, the tape reader is stopped because during this interval the line of code to be recorded has been set up in device 30. Cam C1 then closes its contact CS1 to connect solenoid S1 in line 310 across lines 293 and 294. Solenoid S1 by means of lever 123 opens shutter 121 to a position in which aperture 51 is opened, cam C1 being of such shape as to maintain solenoid S1 energized for the required exposure time. Since in the zero or normal position lens 129 is positioned with respect to film F and exposure station 49, the pattern of light presented by device 30 is reflected by mirrors 139, 132 and 131 to lens 129 which images the line of code on film F. A contact associated with the tape reader and closed by a relay is connected across switch OS1 at T3 to eliminate repeated actuation of switch OS1 by the operator, thereby making the recording of the code automatic and under control of the tape reader. At the instant pin 158 contacts lever 159 to disengage clutch 154, OS1 is, in effect again closed by the tape reader switch and relay R2 is again energized to start another cycle. By providing a special code on the tape after the last line of code to be recorded, a signal is obtained to indicate that recording of the code is completed. As stated hereinbefore, the number of lines of code recorded on each element can vary from one line to seventy lines, in the latter case, of course, if more than sixty lines are recorded, then no recording of document images can be made.

Recording of the documents is controlled by the operator. Upon completion of the code recording, treadle 15 is actuated to raise platen 16 to permit placing of the document in photographing station 33. When the platen is returned to is holding position, a vacuum is automatically applied to hold the document flat in the photographing station, as is well-known in the art. Switch OS2 in line 306 is then actuated to a closed position momentarily and by means of line 305 and contacts R1C, R5C, R6C and R7C in line 297 relay R3 is energized and closes its contact R3C in line 311. With the closing of contact R3C, solenoid S5 is connected across lines 293 and 294 and actuates lever 158 to remove arm 159 from the path of pin 165 on clutch 164, thereby permitting shaft 148 to be coupled to shaft 163. Inasmuch as clutch 164 is provided with two diametrically spaced pins, shaft 163 is permitted to make only one-half a revolution with each actuation of solenoid S5. The first 20° of rotation of shaft 163 rotates plate 196 to withdraw arm 199 and nose 200 thereon into its full back position. Further rotation of plate 196 permits engagement of ratchet 185 by nose 200 and rotation thereof together with plate 184, cam 183, ratchet 186 and the cams on sleeve 182. The movement imparted to cam 183 is transmitted to carriage means 46 to advance film F. If the number of code lines imaged on film F is a multiple of ten, i.e., 10, 20, etc., nose 200 will not advance any film because the tooth on ratchet 185 will have been advanced with ratchet 186, and the phasing of ratchets 185 and 186 is such as to not permit engagement when this condition exists. By this means the first document will be imaged adjacent the code area, as shown in the first two elements on film F in Fig. 4. However, if the number of code lines images is some number other than a multiple of ten, i.e., 12, 23, etc., then ratchet 185 will not be engaged until nose 200 has moved the equivalent of two, three or some other number equivalent to the number of lines exposed over the nearest multiple of ten. This results in an unexposed portion of film between the code and document image areas, as shown in the latter two elements on film F in Fig. 4, but maintains the same image relationship on each element. After this initial advance, however, nose 200 engages ratchet 186 to move an equal amount of film each time.

The rotation of shaft 163 is imparted to shaft 171 by gears 166, 168, 169 and 170 thereby rotating cam 172 in a clockwise direction. Spring 225 urged roller 228 against cam 172 and also moves tie bar 138, rods 134 and 135 and carrier means 128 therewith to position lens 130 with respect to exposure station 49. Carriage means 46 and carrier means 128 are positioned during this one-half revolution of shaft 163 and before completion of the rotation of shaft 163, cam C3, which is carried on shaft 163, momentarily closes its contact CS3 in line 312 to energize timer 313 and exposure timer 244.

Motor M is energized with the closing of switch LS by means of line 314 and contact TC1 in timer 313 and line 292. Upon closing of its contact CS3 by cam C3, motor 316 in timer 313 is connected across lines 291 and 292 by means of line 290, line 317, contacts R4C, R9C and CS3 in line 312, line 318 and normally closed contact ET1 in timer 244. With the energization of motor 316, it closes contact TC2 which holds the motor in through line 317 to line 315, since cam C3 permits its contact CS3 to revert to its normally open position. Following the closing of contact TC2 motor 314 causes contact TC3 to close which connects motor 319 in timer 244 across lines 291 and 292 by means of line 320, contact TC3, line 315, line 318 and contact ET1. Motor 319 then causes contact ET2 in line 290 to close which shorts out the resistance in line 290, thereby applying the full voltage to lamps 34. Contact ET3 is also closed which connects relay R7 across lines 293 and 294 by means of lines 321 and 322. Relay R7 closes its contact R7C in line 321, thereby connecting solenoid S1 across lines 293 and 294 by lines 310, 321 and 322 to actuate shutter 121, and opens its contacts R7C in lines 297 and 303 to render switches OS1, OS2 and SS inoperative. Motor 319 retains solenoid S1 in an energized condition for the required exposure time and then opens its contact ET1 to break its own circuit and that of motor 316 in timer 313. Both timers then automatically reset to their initial positions for another timing cycle. Shaft 163 is now disengaged from shaft 148 due to arm 159 in the path of pin 165. Upon completion of the exposure, treadle 15 is released by the operator, the document is removed from beneath platen 16 and another document is inserted in its place. Switch OS2 is again actuated to energize relay R3 and energize solenoid S5 to release clutch 164, thereby again coupling shaft 163 to shaft 148. Plate 196 is now moving arm 199 downward and toward its full back position and, as a result, ratchet 185 is not advanced nor is any film advanced. Rotation of shaft 163 does, however, rotate cam 172 which permits carrier means 128 to be moved laterally with respect to film F to position lens 130 for the next exposure. In this position, roller 228 engages the portion of cam 172 designated "position 2 and 3." As before, cam C3 actuates its contact CS3 to a closed position to energize timers 244 and 313 for making the exposure. This procedure is repeated for each document until the completion of the exposures is indicated. From the shape of cam 172 it is evident that each land between the first and twelfth positions permits two exposures and that each revolution of shaft 163 provides for film advance during one-half of the revolution and positioning of the carrier means 128, during the other half revolution. In other words, when roller 228 moves carrier means laterally, i.e., whenever roller 228 moves from a low to a high position, or vice versa on the periphery of cam 172, no film is advanced. However, when roller 228 moves along a low or a high position without moving carrier means 128, then film is advanced by movement of carriage means 46.

Dring the last exposure, cam C8 on shaft 171 and cam C7 on sleeve 182 close their respective contacts CS8 and CS7 in line 288 to energize relay R6 in line 323 and lamp 289 in line 324 across relay R6 to indicate the last exposure. Relay R6 opens its contact R6C in line 297, thereby preventing any actuation of the camera due to accidental closure of either switch OS1 or OS2, since only switch SS can now operate the camera to return it to its zero position.

To return carriage means 46 and carrier 128 to their zero or initial positions, switch SS is acuated and relay R9 is energized. Relay R9 opens its contacts R9C in lines 295 and 312 to render timers 244 and 313, relay R1 and switches OS1 and OS2 inoperative and closes its contacts R9C in lines 298, 325, 326 and 327 across T5, relay R9 remaining locked in by the contact R9C in line 326 since cam C6 is not in its zero position. The contact R9C in line 325 connects relay R4 across lines 293 and 294 by means of line 328 because cam C5 is not in its zero position. Relay R4 closes its contacts in lines 330, 325 and 311 and opens its contacts in lines 312 and 329. Contact R4C in line 311 energizes solenoid S5 to release clutch 164 to couple shaft 163 to shaft 148, thereby rotating shaft 171 and cam 172 to position lens 129 with respect to exposure station 49, cam 172 then being in the position shown in Fig. 15 with cam C5 in its zero position and contact CS5 connecting line 325 to line 330 by line 331 and relay R4 is then de-energized. Contact R9C in line 325, CS5, line 331, CS9, line 330 and line 329 then connect relay R5 across line 293 and line 294, cam C9 being off its zero position so contact CS9 is, therefore, closed. Relay R5 closes its contacts R5C in lines 329 and 330, and opens its contact R5C in line 297, the contact in line 330 locking in relay R5. Since contact R9C is still opened in line 312, solenoid S1 which actuates shutter 121 cannot be energized. The closure of contacts R5C in line 329 and 330 also results in solenoid S3 being energized. Solenoid S3 through levers 158 and 159 releases clutch 176 to couple shaft 152 to shaft 175. Since the portion of clutch 180 associated with shaft 178 has been advanced relative to the portion secured to shaft 175 by ratchets 185 and 186, shaft 178 is not rotated until shaft 175 has moved the equivalent of this movement of shaft 178. At this time clutch 180 becomes fully engaged and shafts 175 and 178 are rotated as a unit and rotate sleeve 182 together with cam 183, plate 184, ratchets 185 and 186 and cams C6, C7, C9, C10, C11 and C12. Since shaft 178 is rotated independently of shafts 152 and 175 by arms 193 and 194 engaging ratchets 185 and 186 and carriage means 46 must be returned to its zero position, shaft 178 is not picked up until shafts 152 and 175 have made almost one-half revolution, the additional movement in the first half revolution being necessary to move carriage means 46 to the full extent of its movement to the right in order to provide the additional length of film between the last two exposures and the severing line. In the extreme position cams C10, C11 and C12 close their respective contacts CS10, CS11 and CS12 respectively. Contact CS10 in line 332 connects solenoid S8 across lines 293 and 294 to withdraw perforator 90 from engagement with aperture 23 which it had previously perforated in the film, contact CS11 in line 333 connects solenoid S9 across lines 293 and 294 to actuate locating pin 284 into position and engagement with aperture 23 in the preceding element to hold film F against retrograde movement when carriage means 46 is moved to the zero or normal position, and contact CS12 in line 309 connects solenoid S10 across lines 291 and 292 to release vacuum valve 74. As shaft 178 and sleeve 182 are rotated through second half revolution spring 64 maintains roller 224 against cam 183 and when arm 159 engages clutch pin 177, the carriage means 46 is in its zero position as well as all of the members carried by sleeve 182. When in the zero position, cam C9 opens its contact CS9 and relay R5 is dropped and cam C6 causes relay R9 to be cut out.

In the event only code has been recorded, upon completion of recording, switch SS is actuated and relay R9 is energized and with closure of its contact R9C in line 325, relay R5 is energized through line 325, contact CS5 and lines 331 and 330, being locked in by its contact R5C in line 330 and contact CS9. The sequence of operation from this point on is the same as that already described. By providing connectors T1, T2, T3, T4, T5 and T6 across solenoid S8A, switch OS1, contacts CS2, CS13 and CS14 and the contact R9C in line 327 and connecting said connectors into the tape reader circuit, the sequence of operation for recording from the tape can be controlled completely from the tape reader in conjunction with the camera. Cam C13 (T3) upon closure of its contact in the zero position renders and maintains the tape reader operative. Cam C14 (T4) controls the indexing of the stepping switch associated with device 30, as described in my copending application. T1 across solenoid S8A serves to energize a relay associated with the tape reader each time perforator 90 is actuated to clear the tape reader and condition the circuits thereof for again recording code. T2 is associated with a relay contact and eliminates repeated actuation of switch OS1 by the operator for each line of code to be recorded. T5 connects across the stepping switch of device 30 to insure that the switch is in a "home" position upon setting the camea in a "zero" position. T6 resets device 30 after each line of code is exposed on film F.

From the foregoing description, it is evident that film F is moved in increments dependent on the photographing station in which the information to be recorded is presented and that the increments of film advance are directly related. Further, the optical system associated with each photographing station must occupy different positions with respect to the exposure station and the film, the movement of the optical systems being controlled sequentially and in proper phase with respect to the film advance. Although the order of recording in the disclosed embodiment of the invention is to first record the code and then the documents, this order can be reverse without departing from the spirit of the invention. In a like manner, the order in which the document images are recorded on the film can be altered. The arrangement and manner of coupling the various drive shafts to the drive means can also be varied to obtain different orders of exposure without departing from the spirit of the invention.

Since many modifications of the invention will be readily apparent to those skilled in the art, the invention is not to be limited to the embodiment disclosed and described but is defined by the appended claims.

Having now particularly described my invention, what I desire to secure by Letters Patent of the United States and what I claim is:

1. In apparatus for photographically recording in successive adjacent areas longitudinally of a light-sensitive material related information positioned in different photographing stations, the combination comprising an exposure station for the light-sensitive material arranged in a plane perpendicular to the plane of one of said photographing stations and parallel to the plane of the other of said photographing stations, means for intermittently advancing said light-sensitive material through said exposure station in a predetermined increment to successively position portions of one area in said exposure station and in a predetermined multiple of said increments to successively position portions of the other and adjacent area in said exposure station, drive means for said advancing means, optical means normally positioned with respect to said one photographing station and said exposure station for imaging the information in said one photographing station on the successive portions of the one area of said light-sensitive material and adapted to be moved into an inoperative position, optical means adapted to be moved from an inoperative position to a position with respect to said other photographing station and said exposure station for imaging the information in said other photographing station on successive portions of the other and adjacent area of said light-sensitive material, and means for rendering operative concurrently the advancing means and the optical means associated with each photographing station in accordance with the order that the related information is to be positioned in the photographing stations.

2. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, carriage means movable from a first position to a second position with respect to said exposure station for moving a predetermined length of said light-sensitive material and including means for maintaining said light-sensitive material in engagement therewith during movement between said first and second positions, actuating means operatively connected to said carriage means for imparting movement thereto, advancing means operatively connected to said actuating means for intermittently moving said carriage means in predetermined increments, a second advancing means operatively connected to said actuating means for intermittently moving said carriage means in a predetermined multiple of said increment, drive means for said advancing means, carrier means including optical means associated with and for each of the photographing stations and adapted to be moved laterally of the light-sensitive material and said exposure station, the optical means associated with the one photographing station normally being positioned with respect to said exposure station for imaging the information in said one photographing station in successive portions of the one area of said light-sensitive material, a second actuating means operatively connected to said carrier means for moving said carrier means and the optical means associated with said other photographing station into position with respect to said light-sensitive material and said exposure station and transversely of said light-sensitive material during the interval said light-sensitive material is stationary for imaging the information positioned in said other photographing station in successive portions transversely and longitudinally of the light-sensitive material and in the other and adjacent area thereof, means controlled by the information positioned in said one photographing station for coupling said drive to said first advancing means, and means for operatively coupling said drive means to said second advancing means and said carrier means upon completion of the recording in said one photographing station.

3. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, carriage means movable from a first position to a second position with respect to said exposure station for moving a predetermined length of said light-sensitive material and including means for maintaining said light-sensitive material in engagement therewith during movement between said positions, actuating means operatively engaging said carriage means for imparting movement thereto from said first position to said second position, means for maintaining said actuating means in engagement with said carriage means and for moving said carriage means from said second position to said first position, advancing means operatively connected to said actuating means for intermittently moving said carriage means betewen said first and second positions in predetermined and equal increments, a second advancing means operatively connected to said actuating means for intermittently moving said carriage means between said first and second positions in a predetermined multiple of said increment, drive means for said advancing means, carrier means including optical means associated with and for each of the photographing stations and adapted to be moved laterally of said light-sensitive material and said exposure station, the optical means associated with the one photographing station normally being positioned with respect to said exposure station for imaging the information in said one photographing station in successive portions of the one area of said light-sensitive material, a second actuating means operatively connected to said carrier means for moving said carrier means to position the optical means associated with said other photographing station with respect to said light-sensitive material and said exposure station and transversely of said light-sensitive material during the interval said light-sensitive material is stationary for imaging the information positioned in said other photographing station in successive portions transversely and longitudinally of the light-sensitive material and in the other and adjacent area thereof, means controlled by the information positioned in said one photographing station for coupling said drive means to said first-mentioned advancing means, means for operatively coupling said drive means to said second advancing means and said carrier means upon completion of the recording in said one photographing station, means for coupling said drive means to said actuating means when said carriage means is in said second position to permit return of said carriage means to said first position and of said carrier means to the position in which the optical means for the one photographing station is normally positioned with respect to said exposure station, and means arranged adjacent the second position of said carriage means for engaging the light-sensitive material to prevent retrograde movement thereof during the return movement of said carriage means to said first position.

4. In apparatus for photographically recording in successive adjacent areas longitudinally of a light-sensitive material a plurality of successive lines of code and documents related thereto, said code and documents being positioned in different photographing stations, the combination comprising an exposure station for the light-sensitive material arranged in a plane perpendicular to the plane in which the code is positioned and parallel to the plane of the photographing station in which the documents are positioned, carriage means movable from a first position to a second position for moving a predetermined length of said light-sensitive material past said exposure station and having a chamber and a perforated member for enclosing the open side of said chamber, means mounted on and movable with said carriage means for engaging said light-sensitive material, vacuum producing means operatively connected to said chamber for maintaining said light-sensitive material in engagement with said member, cam means operatively engaging said carriage means for imparting movement thereto between said first and second positions and including a driven member for moving said cam means in predetermined and equal increments in accordance with each line of code positioned in said one photographing station, a second driven member for moving said cam means in a predetermined multiple of said increment in accordance with the documents positioned in said other photographing station and a resilient member for maintaining said cam means and carriage means in engagement and for moving said carriage means from said second position to said first position, said driven members being operatively connected to said cam means and movable as a unit therewith, a drive member associated with and operatively connected to each of said driven members, drive means common to said drive members and to said driven members and cam means, carrier means including optical means for each of the photographing stations and movable laterally of said light-sensitive material and said exposure station, the optical means associated with said one photographing station having an optical axis aligned with the center of said light-sensitive material and being normally positioned with respect thereto for imaging the successive lines of code positioned in said one photographing station in successive portions of the one area of said light-sensitive material and the optical means associated with said other photographing station having an optical axis offset with respect to that of said first-mentioned optical means and longitudinally and laterally with respect to the center of said light-sensitive material when positioned with respect thereto, a second cam means operatively connected to said drive member associated with said second driven member and engaging said carrier means for moving said carrier means to position the optical means associated with said other photographing station with respect to said light-sensitive material and said exposure station and transversely of said light-sensitive material during the interval said light-sensitive material is stationary for imaging the documents positioned in said other photographing station in successive portions transversely and longitudinally of the light-sensitive material and in the other and adjacent area thereof, means for operatively coupling said drive means to the drive member for said first driven member, means for operatively coupling said drive means to the drive member for said second driven member and to said second cam means upon completion of the recording in said one photographing station, means for coupling said drive means to said first and second cam means when said carriage means is in said second position for permitting said carriage means to be returned to said first position and said carrier means to be returned to the position in which the optical means associated with said one photographing station is normally positioned with respect to said exposure station, means arranged adjacent the second position of said carriage means for holding the light-sensitive material to prevent retrograde movement thereof during the return of said carriage means to said first position, and control means for initiating said light-sensitive material engaging means and vacuum producing means and releasing said holding means prior to movement of said carriage means from said first position and for releasing said light-sensitive material engaging means and said vacuum producing means and initiating said holding means when said carriage means is in said second position.

5. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, means for cyclically advancing equal lengths of the light-sensitive material through said exposure station and including means for intermittently advancing equal lengths of said light-sensitive material in a predetermined increment to record the information positioned in said one photographing station in successive portions of one area of the light-sensitive material in said exposure station and in equal lengths equivalent to a predetermined multiple of said increment to record the information positioned in said other photographing station in successive portions of the other and adjacent area of the light-sensitive material in said exposure station, and means controlled by the information in said one photographing station for rendering operative and inoperative the intermittent advancing means associated therewith.

6. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, means for cyclically advancing predetermined and equal lengths of the light-sensitive material and including carriage means for engaging the light-sensitive material for movement thereof with respect to said exposure station, actuating means engaging said carriage means for intermittently moving said carriage means from a normal position to a position in accordance with the predetermined length of said light-sensitive material, an intermittent drive means operatively connected to said actuating means for moving said actuating means in equal and predetermined increments to record the information positioned in said one photographing station in successive portions of one area of the predetermined length of said light-sensitive material with respect to said exposure station, and a second intermittent drive means connected to said actuating means for moving said actuating means in equal increments equivalent to a predetermined multiple of said predetermined increment to record the information positioned in said other photographing station in successive portions of the other and adjacent area of the predetermined length of said light-sensitive material with respect to said exposure station, means controlled by the information positioned in said one photographing station for intermittently rendering the first-mentioned intermittent drive means operative, and means for rendering the second intermittent drive means operative only when said first-mentioned intermittent drive means is rendered inoperative by said control means.

7. In apparatus for photographically recording in successive areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, carriage means mounted for movement with respect to said exposure station including means for perforating a transverse aperture in the light-sensitive material and pneumatic means for maintaining the light-sensitive material in engagement with said carriage means flat during movement thereof through said exposure station, actuating means operatively connected to said carriage means for moving said light-sensitive material with respect to said exposure station in predetermined and equal lengths and including a driven member for moving said actuating means in a predetermined increment to record the information positioned in one of the photographing stations in successive portions of one area of the light-sensitive material adjacent said aperture with respect to said exposure station, and a second driven member for moving said actuating means in a predetermined multiple of said increment to record the information positioned in said other photographing station in successive portions of the other and adjacent area of the light-sensitive material with respect to said exposure station, said driven members being operatively connected to said actuating means and movable as a unit therewith, a drive member associated with and operatively connected to each of said driven members, drive means common to said drive members and to said driven members and said actuating means, means for coupling said drive means successively to said drive members in accordance with the order in which the information is to be recorded in the successive areas and to the actuating means for completing the advancement of the predetermined length of the light-sensitive material, and means movable with said drive members and said actuating means for cyclically actuating said perforating means and said pneumatic means at the beginning and ending of movement of each predetermined length of said light-sensitive material.

8. In apparatus for photographically recording in successive areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, carriage means slidably mounted for movement with respect to said exposure station and for moving predetermined and equal lengths of said light-sensitive material therethrough, said carriage means being movable from a normal position to a position in accordance with the predetermined length of said light-sensitive material and including means for perforating said light-sensitive material with a transverse aperture and pneumatic means for maintaining the portion of said light-sensitive material in engagement with said carriage means flat during movement thereof, actuating means for said carriage means including a cam member in operative engagement with said carriage means, a ratchet member for moving said cam, a second ratchet member for moving said cam, said ratchet members and cam being interconnected and movable as a unit, reciprocating means including a pawl for rotating said first ratchet a predetermined increment and in accordance with the information positioned in said one photographing station to position successive portions of the area of said light-sensitive material adjacent said aperture with respect to said exposure station, a second reciprocating means including a pawl for rotating said second ratchet a predetermined multiple of said increment and in accordance with the information positioned in the other photographing station to position successive portions of the other and adjacent area of the light-sensitive material with respect to said exposure station, a drive means, means for coupling said drive means successively to said first and second reciprocating means and to said actuating means for completing the advancement of the predetermined length of the light-sensitive material, and means movable with said actuating means for maintaining said perforating means and pneumatic means operative throughout the full movement of said carriage means in one direction.

9. In apparatus for photographically recording in successive areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, carriage means slidably mounted for movement with respect to said exposure station and for moving predetermined and equal lengths of said light-sensitive material therethrough, said carriage means being movable from a normal position to a position in accordance with the predetermined length of said light-sensitive material, and including means for perforating said light-sensitive material with a transverse aperture and pneumatic means for maintaining the portion of said light-sensitive material in engagement with said carriage means flat during movement thereof, actuating means for said carriage means including a cam member in operative engagement with said carriage means, a ratchet member for moving said cam, a second ratchet member for moving said cam, said ratchet members and cam being interconnected and movable as a unit, reciprocating means including a pawl for rotating said first ratchet a predetermined increment and in accordance with the information positioned in said one photographing station to position successive portions of the area of said light-sensitive material adjacent said aperture with respect to said exposure station, a second reciprocating means including a pawl for rotating said second ratchet a predetermined multiple of said increment and in accordance with the information positioned in the other photographing station to position successive portions of the other and adjacent area of the light-sensitive material with respect to said exposure station, a drive means, means for coupling said drive means successively to said first and second reciprocating means and to said actuating means for completing the advancement of the predetermined length of the light-sensitive material, and means movable with said actuating means for maintaining said perforating means and pneumatic means operative throughout the full movement of said carriage means, and means rendered operative upon completion of recording the information positioned in said photographing stations for returning said actuating means and said carriage means to the normal position.

10. In apparatus for photographically recording in successive areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, carriage means slidably mounted for movement with respect to said exposure station and for moving predetermined and equal lengths of said light-sensitive material therethrough, said carriage means being movable from a normal position to a position in accordance with the predetermined length of said light-sensitive material, and including means for perforating said light-sensitive material with a transverse aperture and pneumatic means for maintaining the portion of said light-sensitive material in engagement with said carriage means flat during movement thereof, actuating means for said carriage means including a cam member in operative engagement with said carriage means, a ratchet member for moving said cam, a second ratchet member for moving said cam, said ratchet members and cam being interconnected and movable as a unit, reciprocating means including a pawl for rotating said first ratchet a predetermined increment and in accordance with the information positioned in said one photographing station to position successive portions of the area of said light-sentitive material adjacent said aperture with respect to said exposure station, a second reciprocating means including a pawl for rotating said second ratchet a predetermined multiple of said increment and in accordance with the information positioned in the other photographing station to position successive portions of the other and adjacent area of the light-sensitive material with respect to said exposure station, a drive means, means controlled by the information to be positioned in said one photographing station for coupling and decoupling said drive means to the first-mentioned reciprocating means, means for coupling said drive means to said second reciprocating means upon final decoupling of the first-mentioned reciprocating means and for moving said second ratchet and actuating means into a position wherein subsequent movement of the second reciprocating means will advance a predetermined multiple of the light-sensitive material, means responsive to said actuating means for indicating completion of recording in the other and adjacent area, means movable with said actuating means for maintaining said perforating means and pneumatic means operative throughout the full movement of said carriage means in one direction, means for coupling said drive means to said actuating means upon completion of recording for completing the advancement of the predetermined length of the light-sensitive material and upon completion of the advancement releasing said perforating means and said pneumatic means with respect to the light-sensitive material to permit return of said carriage means to the normal position.

11. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, optical means normally positioned with respect to said one photographing station and said exposure station for imaging the information in said one photographing station on the light-sensitive material in one area thereof and adapted to be moved into an inoperative position, optical means adapted to be moved from an inoperative position to a position with respect to said other photographing station and said exposure station for imaging the information in said other photographing station on the light-sensitive material in the other area adjacent said one area, and means for concurrently moving said first-mentioned optical means into said inoperative position and said second-mentioned optical means into position with respect to said exposure station upon completion of the imaging of the information in said one photographing station.

12. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, means for intermittently advancing the light-sensitive material through said exposure station, carrier means including optical means associated with and for each of the photographing stations and adapted to be moved laterally of the light-sensitive material and said exposure station, and means operatively connected to said carrier means for controlling the movement of said carrier means to successively position the optical means with respect to said exposure station for imaging the information in said one photographing station in successive portions of the one area of the light-sensitive material and for imaging the information in said other photographing station in successive portions of the other and adjacent area of the light-sensitive material.

13. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, means for intermittently advancing he light-sensitive material through said exposure station, carrier means including optical means for each of the photographing stations and movable laterally of said light-sensitive material and said exposure station, and means operatively connected to said carrier means for maintaining the optical means associated with said one photographing station in relation with respect to said exposure station to intermittently record the information positioned in said one photographing station in successive portions of one area of the light-sensitive material and for intermittently moving said carrier means transversely of the light-sensitive material and said exposure station to position the optical means associated with the other photographing station with respect to said exposure station to record the information positioned in said other photographing station in successive portions of the other and adjacent area of said light-sensitive material.

14. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, means for intermittently advancing said light-sensitive material through said exposure station, carrier means including optical means for each of the photographing stations and movable laterally of said light-sensitive material and said exposure station, and means operatively connected to said advancing means and said carrier means for maintaining the optical means associated with said one photographing station in relation with respect to said exposure station to record the information positioned in said one photographing station in successive transverse portions of one area of the light-sensitive material and for intermittently oscillating said carrier means transversely of the light-sensitive material and said exposure station during the interval the light-sensitive material is stationary in said exposure station to record the information positioned in the other photographing station in successive portions transversely and longitudinally of the light-sensitive material and in the other and adjacent area thereof.

15. In apparatus for photographically recording in successive adjacent areas longitudinally of a light-sensitive material related information positioned in different photographiing stations, the combination comprising an exposure station for the light-sensitive material arranged in a plane perpendicular to the plane of one of the photographing stations and parallel to the plane of the other photographing station, means for intermittently advancing said light-sensitive material through said exposure station, carrier means including optical means for each of the photographing stations and movable laterally of said light-sensitive material and said exposure station, the optical means associated with said one photographing station having an optical axis aligned with the center of said light-sensitive material and being normally positioned with respect thereto and the optical means associated with said other photographing station having an optical axis offset with respect to that of said first-mentioned optical means and longitudinally and laterally with respect to the center of said light-sensitive material when positioned with respect thereto, and means operatively connected to said advancing means and said carrier means for maintaining the optical means associated with said one photographing station in its normal position during recording of the information positioned in said one photographing station in successive portions of one area of said light-sensitive material and for moving the optical means associated with said other photographing station into position with respect to said light-sensitive material and said exposure station and transversely of said light-sensitive material during the interval said light-sensitive material is stationary to record the information positioned in said other photographing station in successive portions transversely and longitudinally of the light-sensitive material and in the other and adjacent area thereof.

16. In apparatus for photographically recording in successive adjacent areas longitudinally of a light-sensitive material related information positioned in different photographing stations, the combination comprising an exposure station for the light-sensitive material arranged in a plane perpendicular to the plane of one of the photographing stations and parallel to the plane of the other photographing station, means for intermittently advancing said light-sensitive material through said exposure station, carrier means including optical means for each of the photographing stations and movable laterally of said light-sensitive material and said exposure station, the optical means associated with said one photographing station having an optical axis aligned with the center of said light-sensitive material and being normally positioned with respect thereto and the optical means associated with said other photographing station having an optical axis offset with respect to that of said first-mentioned optical means and longitudinally and laterally with respect to the center of said light-sensitive material when positioned with respect thereto, and means operatively connected to said advancing means and said carrier means for maintaining the optical means associated with said one photographing station in its normal position during recording of the information positioned in said one photographing station in successive portions of one area of said light-sensitive material and for moving the optical means associated with said other photographing station into position with respect to said light-sensitive material and said exposure station and transversely of said light-sensitive material during the interval said light-sensitive material is stationary to record the information positioned in said other photographing station in successive portions transversely and longitudinally of the light-sensitive material and in the other and adjacent area thereof, and means associated with said advancing means for rendering said last-mentioned means operative, upon completion of recording the information in said one photographing station to position the optical means associated with the other photographing station with respect to said exposure station.

17. In apparatus for photographically recording in successive adjacent areas longitudinally of a light-sensitive material a plurality of successive lines of code and documents related thereto, said code and documents being positioned in different photographing stations, the combination comprising an exposure station for the light-sensitive material arranged in a plane perpendicular to the plane of the photographing station in which the code is positioned and parallel to the plane of the photographing station in which the document is positioned, means for intermittently advancing said light-sensitive material through said exposure station, carrier means including optical means for each of the photographing stations and movable transversely of said light-sensitive material and said exposure station, the optical means associated with the code photographing station being normally positioned centrally of said light-sensitive material and said exposure station for imaging the lines of code successively positioned in the code photographing station in successive portions of the one area of the light-sensitive material and the optical means associated with the document photographing station being offset with respect to said first-mentioned optical means and said light-sensitive material when positioned with respect to said exposure station, actuating means operatively connected to said advancing means for moving said carrier means to position the optical means for said document photographing station with respect to said exposure station and for intermittently moving said carrier means transversely of said light-sensitive material during the interval the light-sensitive material is stationary to image documents successively positioned in the photographing station in successive portions transversely and longitudinally of the light-sensitive material and in the other and adjacent area thereof.

18. In apparatus for photographically recording in successive adjacent areas longitudinally of a light-sensitive material a plurality of successive lines of code and documents related thereto, said code and documents being positioned in different photographing stations, the combination comprising an exposure station for the light-sensitive material arranged in a plane perpendicular to the plane of the photographing station in which the code is positioned and parallel to the plane of the photographing station in which the document is positioned, means for intermittently advancing said light-sensitive material through said exposure station, carrier means including optical means for each of the photographing stations and movable transversely of said light-sensitive material and said exposure station, the optical means associated with the code photographing station being normally positioned centrally of said light-sensitive material and said exposure station for imaging the lines of code successively positioned in the code photographing station in successive portions of the one area of the light-sensitive material and the optical means associated with the document photographing station being offset with respect to said first-mentioned optical means and said light-sensitive material when positioned with respect to said exposure station, actuating means operatively connected to said advancing means for moving said carrier means to position the optical means for said document photographing station with respect to said exposure station and for intermittently moving said carrier means transversely of said light-sensitive material during the interval the light-sensitive material is stationary to image documents successively positioned in the photographing station in successive portions transversely and longitudinally of the light-sensitive material and in the other and adjacent area thereof, and means associated with said advancing means for rendering said actuating means operative, upon completion of recording the code.

19. A device for moving a predetermined length of a light-sensitive material past an exposure station, comprising in combination a carriage means movable with respect to said exposure station and including a member having a chamber and a perforated plate for enclosing the open side of said chamber, vacuum producing means operatively connected to said chamber for maintaining said light-sensitive material in engagement with said plate when positioned with respect thereto, perforating means for said light-sensitive material mounted on and movable with said carriage means, actuating means operatively connected to said carriage means for moving said carriage means from a normal position to a second position in which said predetermined length of the light-sensitive material is moved past said exposure station, means for holding the light-sensitive material when said carriage means is in said second position to prevent retrograde movement thereof, control means associated with said actuating means for initiating said perforating means and vacuum producing means and releasing said holding means when said carriage means is in said normal position and for releasing said perforating means and vacuum producing means and initiating said holding means when said carriage means is in said second position.

20. A device for moving a predetermined length of a light-sensitive material past an exposure station, each predetermined length being provided with an aperture, comprising in combination a carriage means movable with respect to said exposure station and including a member having a chamber and a perforated plate for enclosing the open side of said chamber, vacuum producing means operatively connected to said chamber for maintaining said light-sensitive material in engagement with said carriage means when positioned with respect to said plate, means mounted on and movable with said carriage means for engaging the aperture in the length positioned on said plate, a drive means, actuating means operatively engaging said carriage means for imparting movement thereto between a normal position and a second position in which the predetermined length of said light-sensitive material is moved past said exposure station, means arranged between said drive means and said actuating means and operatively connected thereto for imparting an intermittent movement to said actuating means to move said carriage means from said normal position to said second position, means for holding the light-sensitive material when said carriage means is in said second position to prevent retrograde movement thereof, means for coupling said drive means to said actuating means to permit movement of said carriage means from said second position to said normal position, and control means associated with said actuating means for initiating said engaging means and vacuum producing means and releasing said holding means when said carriage means is in said normal position and for releasing said engaging means and vacuum producing means and initiating said holding means when said carriage means is in said second position.

21. A device for moving a predetermined length of a light-sensitive material intermittently past an exposure station, each predetermined length being provided with an aperture, comprising in combination a carriage means slidably mounted for movement between a normal position and a second position with respect to said exposure station and having a chamber with the side adjacent said exposure station provided with a plurality of apertures, vacuum producing means operatively connected to said chamber for maintaining said light-sensitive material in engagement with said carriage means when positioned with respect to said side, means mounted on and movable with said carriage means for engaging the aperture in the predetermined length of said light-sensitive material positioned on said carriage means, a drive means, cam means operatively engaging said carriage means for moving said carriage means between said positions, means operatively connected to said drive means and to said cam means for imparting intermittent movement to said carriage means during its movement from said normal position to said second position, means rendered operative when said carriage means is in said second position for coupling said drive means to said cam means to permit movement of said carriage means from said second position to said normal position, holding means arranged adjacent the second position of said carriage means and including movable members for engaging the aperture in a preceding length of said light-sensitive material to prevent retrograde movement thereof during movement of said carriage means to said normal position, and control means associated with said actuating means for initiating said perforating means and vacuum producing means and releasing said holding means when said carriage means is in said normal position and for releasing said perforating means and vacuum producing means and initiating said holding means when said carriage means is in said second position.

References Cited in the file of this patent

UNITED STATES PATENTS

| | | |
|---|---|---|
| 1,826,664 | Hopkins | Oct. 6, 1931 |
| 2,355,268 | Bryce | Aug. 8, 1944 |
| 2,630,743 | O'Kane | Mar. 10, 1953 |